(12) United States Patent
Nakagiri et al.

(10) Patent No.: US 7,161,691 B2
(45) Date of Patent: Jan. 9, 2007

(54) METHOD AND APPARATUS FOR MULTIPLE MEDIA PRINTING

(75) Inventors: Koji Nakagiri, Kanagawa (JP); Satoshi Nishikawa, Kanagawa (JP); Yasuo Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 750 days.

(21) Appl. No.: 10/193,121

(22) Filed: Jul. 12, 2002

(65) Prior Publication Data

US 2003/0011802 A1    Jan. 16, 2003

(30) Foreign Application Priority Data

Jul. 16, 2001 (JP) .............................. 2001-215936
Nov. 9, 2001 (JP) .............................. 2001-345083

(51) Int. Cl.
*G06F 15/00*    (2006.01)

(52) U.S. Cl. ............... 358/1.13; 358/1.15; 715/527

(58) Field of Classification Search ............... 358/1.13, 358/1.15, 1.12; 715/527, 517; 399/45, 81
See application file for complete search history.

(56) References Cited

U.S. PATENT DOCUMENTS

| 5,481,353 | A | * | 1/1996 | Hicks et al. ............... 399/382 |
| 5,781,175 | A | * | 7/1998 | Hara .......................... 345/670 |
| 5,867,632 | A | * | 2/1999 | Andree et al. ............... 358/1.9 |
| 5,963,216 | A | * | 10/1999 | Chiarabini et al. ......... 345/660 |
| 6,393,231 | B1 | | 5/2002 | Okawa et al. ............... 399/81 |
| 6,411,400 | B1 | | 6/2002 | Mori .......................... 358/1.2 |
| 6,417,931 | B1 | | 7/2002 | Mori et al. ................. 358/1.15 |
| 6,616,359 | B1 | | 9/2003 | Nakagiri et al. ............ 400/582 |
| 6,621,590 | B1 | * | 9/2003 | Livingston .................. 358/1.15 |
| 6,661,530 | B1 | * | 12/2003 | Munetomo et al. ........ 358/1.15 |
| 6,943,903 | B1 | * | 9/2005 | Simpson et al. ........... 358/1.12 |
| 6,947,158 | B1 | * | 9/2005 | Kitamura et al. .......... 358/1.15 |
| 2001/0056449 | A1 | | 12/2001 | Kawamoto et al. ......... 707/527 |
| 2003/0103237 | A1 | * | 6/2003 | Han .......................... 358/1.18 |

FOREIGN PATENT DOCUMENTS

| JP | 8-248711 | 9/1996 |
| JP | 10-221908 | 8/1998 |
| JP | 10-322487 | 12/1998 |
| JP | 11-143667 | 5/1999 |
| JP | 2000-039980 | 2/2000 |
| JP | 2000-339121 | 12/2000 |
| JP | 2001-100468 | 4/2001 |
| JP | 2001-134024 | 5/2001 |
| JP | 2001-134409 | 5/2001 |
| JP | 2001-134560 | 5/2001 |
| JP | 2001-166640 | 6/2001 |

OTHER PUBLICATIONS

U.S. Appl. No. 09/123,328, filed Jul. 28, 1998.

(Continued)

*Primary Examiner*—Kimberly Williams
*Assistant Examiner*—Dillon Murphy
(74) *Attorney, Agent, or Firm*—Fitzpatrick, Cella, Harper & Scinto

(57) ABSTRACT

When a presentation mode in which print information of a single original is to be printed on an OHP film and paper sheet is designated, print settings for the OHP film and paper sheet are set, one of the OHP film and paper sheet or both of them are selected as a preview subject, and the preview of the printing result on the preview subject is displayed on the basis of the print settings for the selected preview subject.

29 Claims, 24 Drawing Sheets

OTHER PUBLICATIONS

U.S. Appl. No. 09/949,875, filed Sep. 12, 2001.
U.S. Appl. No. 09/244,475, filed Feb. 4, 1999.
U.S. Appl. No. 09/703,684, filed Nov. 2, 2000.
U.S. Appl. No. 09/703,692, filed Nov. 2, 2000.
U.S. Appl. No. 09/703,628, filed Nov. 2, 2000.
U.S. Appl. No. 09/703,687, filed Nov. 2, 2000.
U.S. Appl. No. 09/924,724, filed Aug. 9, 2001.

* cited by examiner

FIG. 10

| |  |
|---|---|
| ID CAPABLE OF IDENTIFYING JOB | ~1001 |
| JOB SETTING INFORMATION | ~1002 |
| NUMBER OF PHYSICAL PAGES OF JOB | ~1003 |
| FIRST PHYSICAL PAGE INFORMATION | ~1004 |
| SECOND PHYSICAL PAGE INFORMATION | |
| . . . | |
| LAST PHYSICAL PAGE INFORMATION | |

FIG. 11

| | |
|---|---|
| TOTAL NUMBER OF PHYSICAL PAGES | ~1101 |
| TOTAL NUMBER OF LOGICAL PAGES | ~1102 |
| NUMBER OF COPIES | ~1103 |
| PRINTING FOR EACH COPY | ~1104 |
| FINISHING INFORMATION | ~1105 |
| ADDITIONAL PRINTING INFORMATION | ~1106 |

FIG. 13

| | |
|---|---|
| LAYOUT ORDER OF LOGICAL AGES ON PHYSICAL PAGE | ~1301 |
| UPPER OR LOWER SURFACE FOR DOUBLE-SIDE PRINTING | ~1302 |
| COLOR PAGE OR MONOCHROME PAGE | ~1303 |
| ADDITIONAL PRINTING INFORMATION | ~1304 |

- 2001 — PAPER TYPE (Y): OHP FILM ▶
- 2002 — COLOR PRINT MODE (C): FULL COLOR ▶
- 2003 — OUTPUT PAPER SIZE (Z): SAME AS ORIGINAL SIZE ▶
- 2004 — NUMBER OF COPIES (O): 1 ▲▼ COPIES (1~2000)
- 2005 — PAGE LAYOUT (L): 1 PAGE/SHEET (STANDARD) ▶
- 2006 — PRINTING METHOD (Y): ◉ SINGLE-SIDE PRINTING
  ○ DOUBLE-SIDE PRINTING
  ○ BOOKBINDING PRINTING
  DISCHARGE SETTINGS (G)...
- 2007 — DISCHARGE METHOD (H): NO DESIGNATION ▶
- 2008 — DISCHARGE DESTINATION: DISCHARGE TRAY

[OK] [CANCEL] [HELP (H)]

METHOD AND APPARATUS FOR MULTIPLE MEDIA PRINTING

FIELD OF THE INVENTION

The present invention relates to a printing control apparatus, and a display method, program, and storage medium therefor.

BACKGROUND OF THE INVENTION

When presentation is to be done using an overhead projector (OHP), routine operation may occur in which one copy of an original is printed on an OHP film for presentation, and a necessary number of copies are printed on paper sheets to be distributed. In such case, the following procedure is generally used. That is, the original is created by an information processing apparatus such as a personal computer. One copy of an output for the OHP is printed on a paper sheet by an output apparatus such as a printer. The printed original is copied to an OHP film by a copying machine. Additionally, the number of copies, layout, single- or double-side print mode, and staple are set for distribution, OHP output is changed to paper output, and the original is copied.

Recently, a personal computer and printer can be connected. Printers capable of stapling or printing on an OHP film as an output medium are becoming popular. Hence, the user can execute the operation only by a personal computer and printer without using any copying machine. In such operation using a personal computer and printer, first, an original is created on the host computer. An OHP output for presentation is printed by directly designating for the printer an OHP film as an output medium. Next, the print settings can be changed to print the original on paper sheets to be distributed.

In the prior art, when a plurality of different printing layouts (OHP output for presentation and paper output for distribution) are to be set for a single original created by an information processing apparatus, and the original is to be printed by an output apparatus, results by the respective printing layouts should be checked by displaying previews on a screen in advance before actual printing is executed. However, the conventional preview function is not designed to select one of the plurality of different printing layouts or a combination of a plurality of different printing layouts and display its printing result. The function is not designed to confirm the printing results displayed as previews and change settings for each printing-layout.

SUMMARY OF THE INVENTION

The present invention has been made to solve the above problems, and has as its object to provide a printing control apparatus capable of, in printing a single original on a plurality of output media, previewing a printing result for each output medium or a printing result for a combination of a plurality of printing media before printing is executed in accordance with print settings for each output medium, and a display method, program, and storage medium for the printing control apparatus.

In order to achieve the above object, according to an aspect of the present invention, a printing control apparatus comprising: mode designation means for designating a print mode in which a single original is output to a plurality of output media; setting means for setting print settings for the plurality of output media when the print mode is set; and display control means for executing control to select a desired output medium from the plurality of output media and display, as a preview, a printing result on the selected output medium on the basis of print settings for the output medium is provided.

According to another aspect of the present invention, a display method for a printing control apparatus, comprising the steps of: designating a print mode in which a single original is output to a plurality of output media; setting print settings for the plurality of output media when the print mode is set; and executing control to select a desired output medium from the plurality of output media and display, as a preview, a printing result on the selected output medium on the basis of print settings for the output medium, is provided.

According to still another aspect of the present invention, a program for causing a computer to function as: mode designation means for designating a print mode in which a single original is output to a plurality of output media; setting means for setting print settings for the plurality of output media when the print mode is set; and display control means for executing control to select a desired output medium from the plurality of output media and display, as a preview, a printing result on the selected output medium on the basis of print settings for the output medium is provided.

According to still another aspect of the present invention, a computer-readable recording medium which records program for causing a computer to function as: mode designation means for designating a print mode in which a single original is output to a plurality of output media; setting means for setting print settings for the plurality of output media when the print mode is set; and display control means for executing control to select a desired output medium from the plurality of output media and display, as a preview, a printing result on the selected output medium on the basis of print settings for the output medium is provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a view showing a job output setting file in the embodiment;

FIG. 11 is a view showing job setting information in a field 1002 shown in FIG. 10;

FIG. 13 is a view showing physical page setting information in a field 1202 shown in FIG. 12;

FIG. 18 is a view showing a job setting window;

FIG. 20 is a view showing the detail setting dialogue of a presentation mode;

FIG. 21 is a view showing a job setting window when "distribution" is selected in a preview subject selection combo-box 2103;

Figure 22:
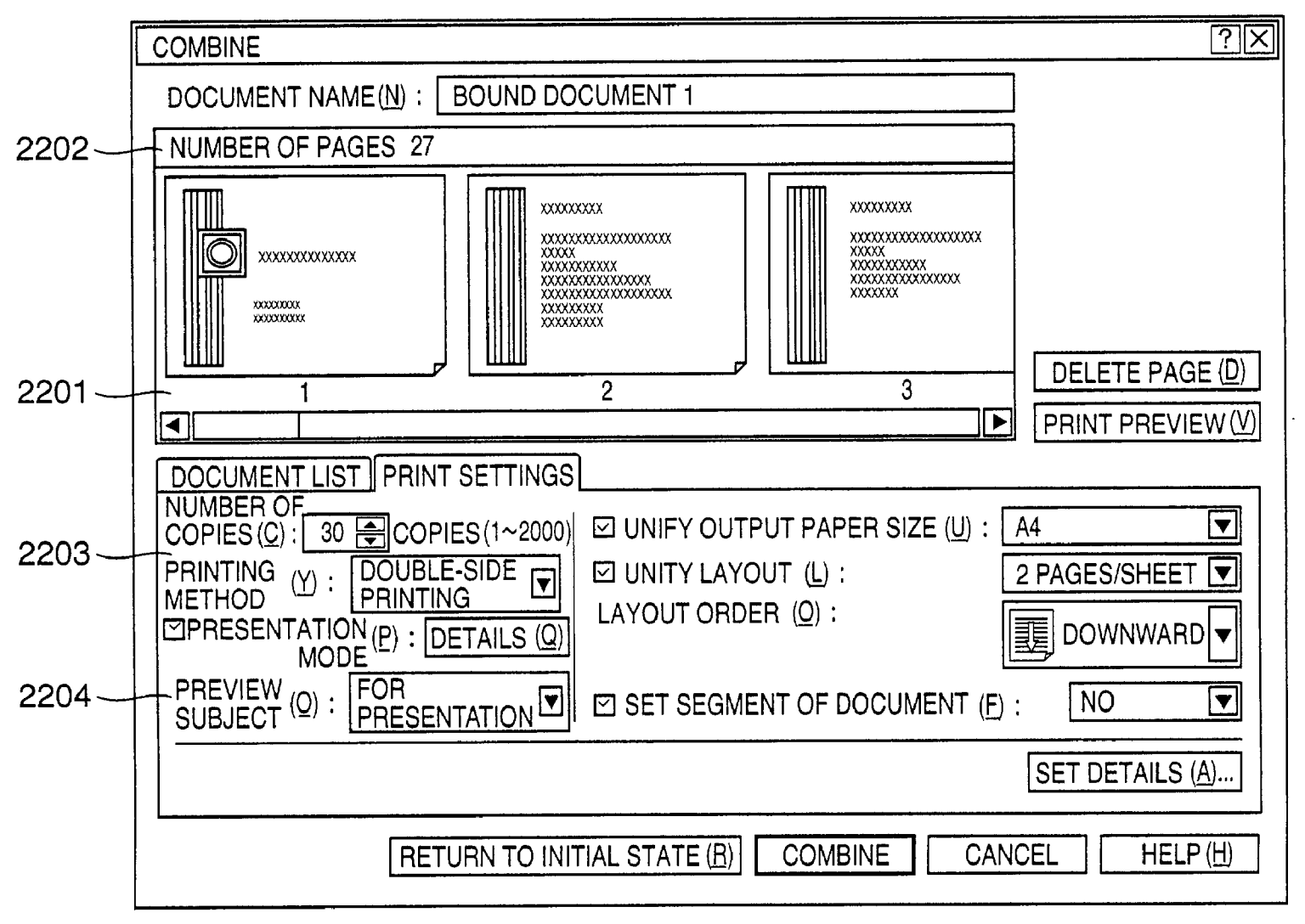

FIG. 22 is a view showing a job setting window when "presentation" is selected in a preview subject selection combo-box 2204;

DETAILED DESCRIPTION OF THE PREFERRED EMBODIMENT

The embodiment of the present invention will be described below in detail with reference to the accompanying drawings.

Before the description of this embodiment, the arrangement of a system formed from a printer to which the present invention can be applied and an information processing apparatus such as a personal computer connected to the printer and, more particularly, a printing system having a spooler serving as a spool means for, before print data to be transmitted to a printer is generated, temporarily storing the print data using a data format (so-called intermediate code) different from that of print data to be finally sent to a printer, a despooler serving as a despool means for generating the print data to be finally sent to the printer from the data temporarily stored in the intermediate code format, and a printer driver serving as a means for generating a printer control command will be described.

Figure 1:
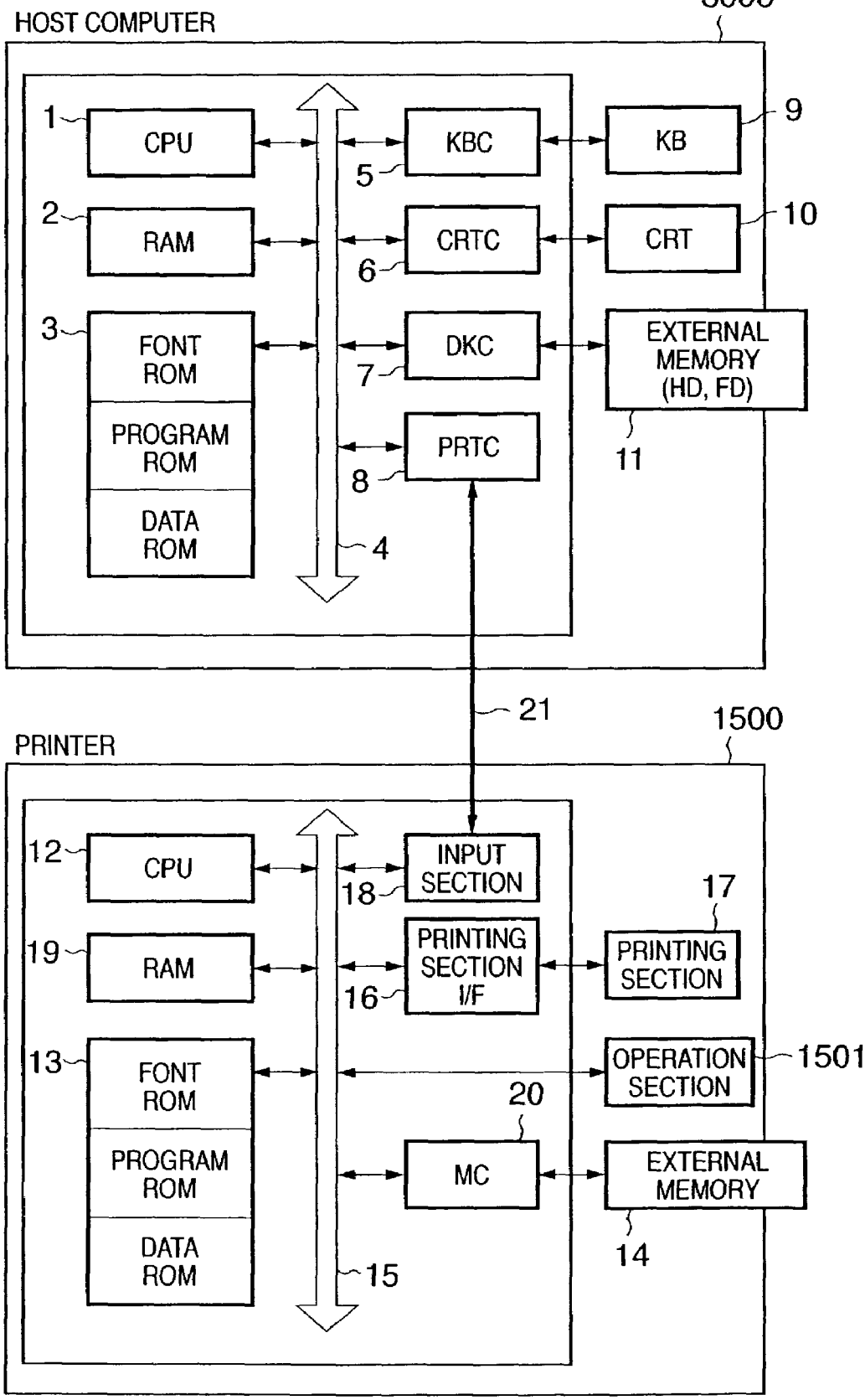
FIG. 1 is a block diagram showing the arrangement of a printer control system according to the embodiment.

FIG. 1 is a block diagram showing the arrangement of a printer control system according to the embodiment. As shown in FIG. 1, the printer control system is constituted by a host computer 3000 and printer 1500.

The present invention can be applied to a single device, a system formed from a plurality of devices, or a system connected through a network such as a LAN or WAN to execute processing as far as the function of the present invention can be implemented.

The host computer 3000 shown in FIG. 1 has a CPU 1 which processes documents made up from graphics, images, characters, tables (including spreadsheets), and the like in a mixed manner, on the basis of a document processing program stored in the program ROM in a ROM 3 or in an external memory (HD or FD) 11. The CPU 1 systematically controls all devices connected to a system bus 4. The program ROM in the ROM 3 or the external memory 11 stores an operating system (to be referred to as an "OS" hereinafter) serving as the control program of the CPU 1. The font ROM in the ROM 3 or the external memory 11 stores font data to be used in document processing. The data ROM in the ROM 3 or the external memory 11 stores various data to be used in document processing. A RAM 2 functions as a main memory or work area of the CPU 1.

In the host computer 3000, a keyboard controller (KBC) 5 controls an input from a keyboard 9 or a pointing device (not shown). A CRT controller 6 controls display on a CRT display (CRT) 10. A disk controller (DKC) 7 controls access to the external memory 11 such as a hard disk (HD) or floppy disk (FD) which stores a boot program, various kinds of applications, font data, user files, edit files, and printer control command generation program (to be referred to as a "printer driver" hereinafter). A printer controller (PRTC) 8 executes communication control processing with the printer 1500 connected through a bidirectional interface (interface) 21.

The CPU 1 executes, e.g., rasterizing of an outline font on a display information area set on the RAM 2 to allow WYSIWYG on the CRT 10. The CPU 1 also opens various kinds of registered windows on the basis of a command pointed by a mouse cursor (not shown) on the CRT 10 and executes various data processing operations. With this arrangement, in executing printing, the user can open a window related to print settings to set the printer or set the print processing method for the printer driver including selection of a print mode.

On the other hand, in the printer 1500, a printer CPU 12 outputs an image signal as output information to a printing section (printer engine) 17 connected to a system bus 15 on the basis of a control program stored in the program ROM in a ROM 13 or a control program stored in an external memory 14. The program ROM in the ROM 13 also stores the control program of the CPU 12. The font ROM in the ROM 13 stores font data to be used in generating output information. When the printer has no external memory 14 such as a hard disk, the data ROM in the ROM 13 stores information to be used on the host computer.

The CPU 12 can communicate with the host computer 3000 through an input section 18 so that information in the printer 1500 can be sent to the host computer 3000. A RAM 19 functions as the main memory or work area of the CPU 12. The memory capacity of the RAM 19 can be expanded using an optional RAM connected to an expansion port (not shown).

The RAM 19 is used as an output information rasterizing area, environment data storage area, or NVRAM. Access to the above-described external memory 14 such as a hard disk (HD) or IC card is controlled by a memory controller (MC) 20. The external memory 14 is connected as an option to store font data, an emulation program, and form data. An operation panel 1501 is formed from switches and LED indicators for operation.

The number of above-described external memories 14 is not limited to one. Instead, a plurality of optional cards in addition to internal fonts or a plurality of external memories which store programs for interpreting printer control languages of different language systems may be connected. In addition, an NVRAM (not shown) may be arranged to store print mode setting information from the operation panel 1501.

Typical print processing executed by the host computer to which a printing apparatus such as a printer is connected directly or through a network will be described next.

Figure 2:
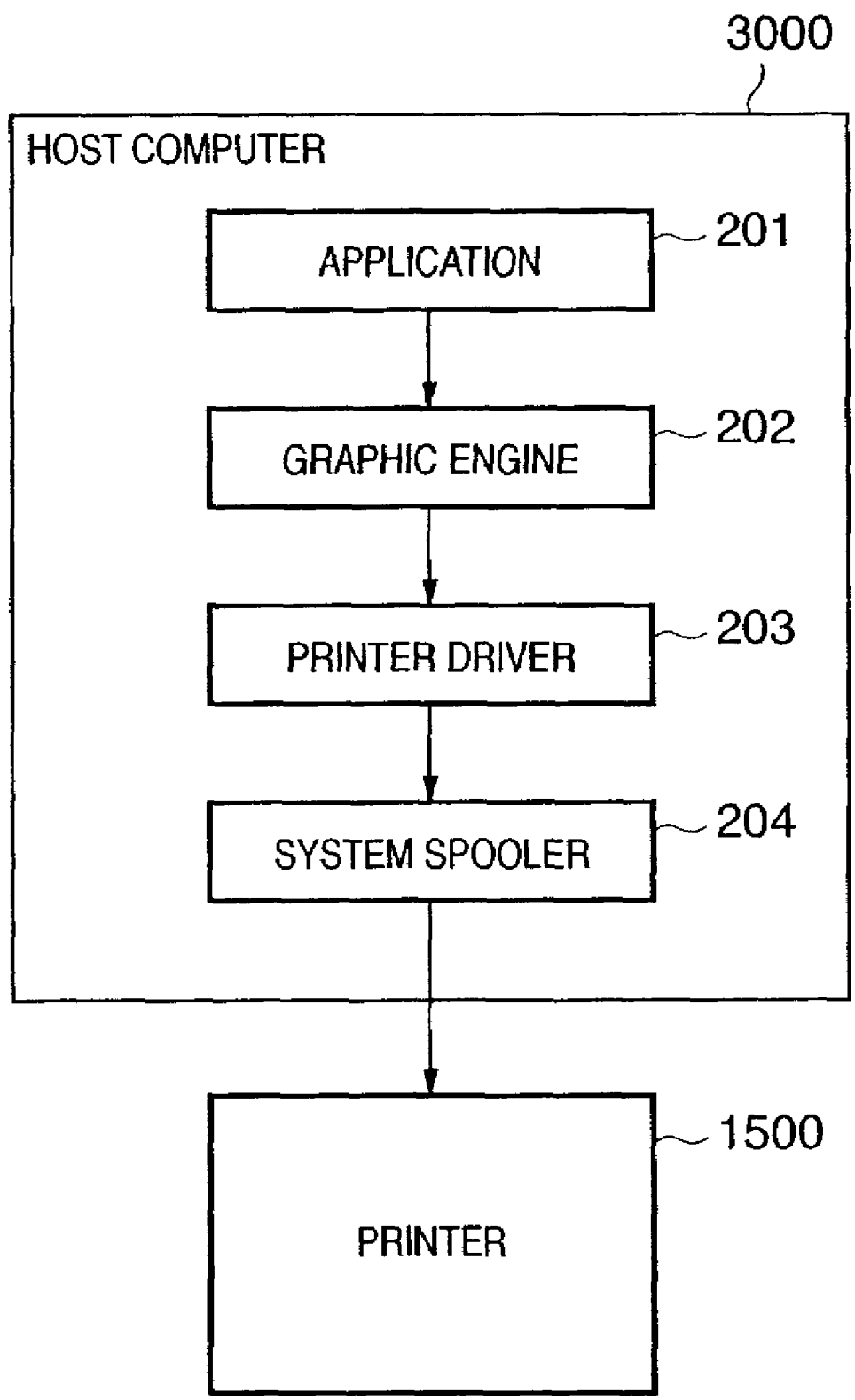
FIG. 2 is a block diagram showing print processing executed by a host computer 3000.

FIG. 2 is a block diagram showing print processing executed by the host computer 3000. An application 201, graphic engine 202, printer driver 203, and system spooler 204 in FIG. 2 are present as files stored in the external memory 11. In executing a file as a program module, it is loaded into the RAM 2 by the OS or a module which uses the module and executed. The application 201 and printer driver 203 may be added to the HD of the external memory 11 through an FD of the external memory 11, a CD-ROM (not shown), or a network (not shown).

First, the application 201 stored in the external memory 11 is loaded into the RAM 2 and executed. When the application 201 outputs a print instruction to the printer 1500 by the keyboard 9 or a mouse (not shown), output (rendering) is performed using the graphic engine 202 which is also loaded into the RAM 2 and is executable.

The graphic engine 202 loads the printer driver 203 prepared for each printing apparatus from the external memory 11 into the RAM 2 and sets the output from the application 201 in the printer driver 203. The graphic engine 202 also converts a GDI (Graphic Device Interface) function received from the application 201 into a DDI (Device Driver Interface) function and outputs it to the printer driver 203.

The printer driver 203 converts the DDI function received from the graphic engine 202 into a control command, e.g., a PDL (Page Description Language) that can be recognized by the printer 1500. The converted printer control command is transferred to the system spooler 204 loaded into the RAM 2 by the OS and output to the printer 1500 through the interface 21 as print data.

The printing system of this embodiment will be described. In this embodiment, in addition to the printing system formed from the printer and host computer shown in FIG. 2, an arrangement for temporarily spooling print data from an application by intermediate code data is added, as shown in FIG. 3.

Figure 3:
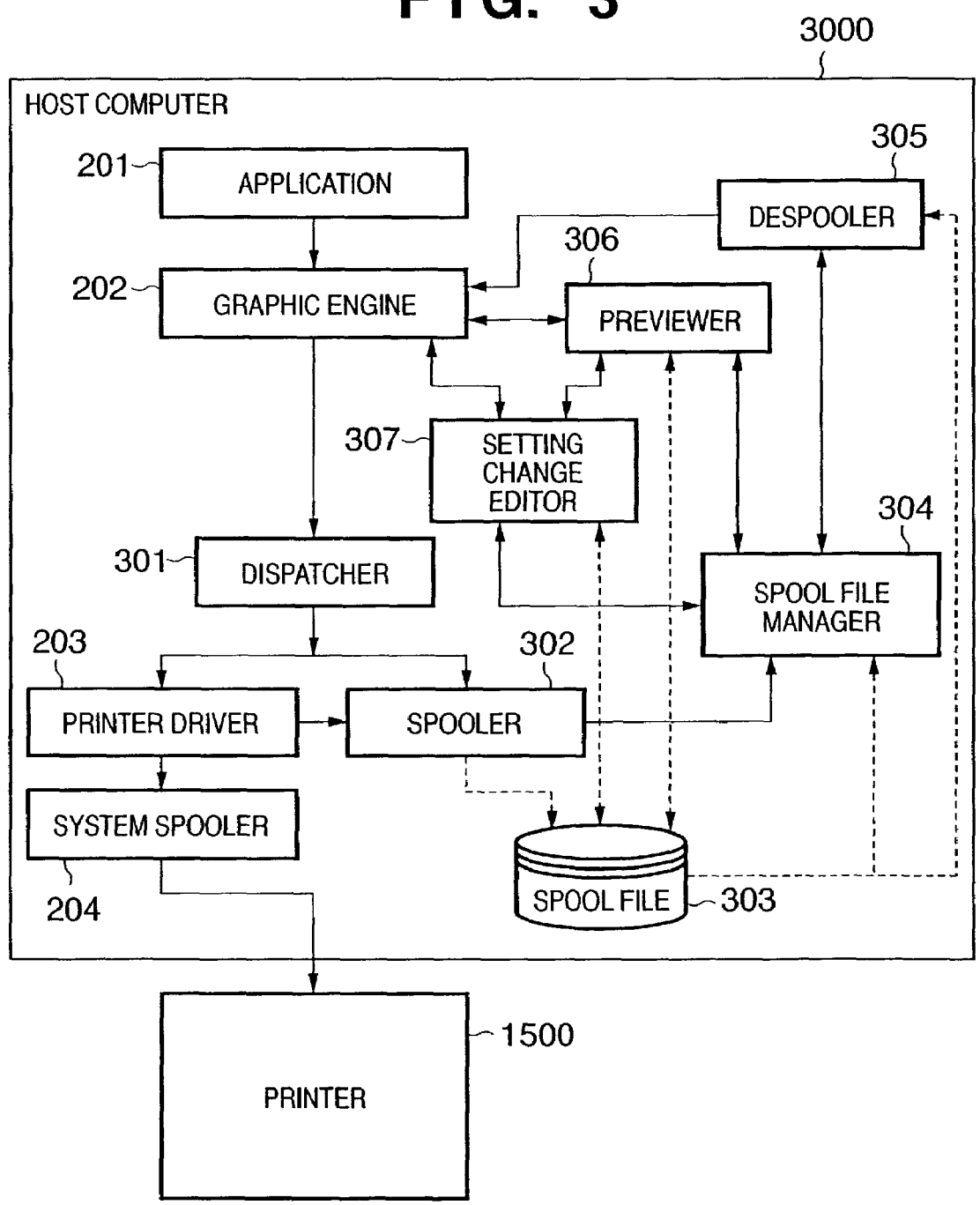
FIG. 3 is a block diagram showing an arrangement for temporarily spooling a printing instruction from an application by intermediate code data.

FIG. 3 shows an arrangement obtained by extending the system shown in FIG. 2, which temporarily generates a spool file 303 formed from an intermediate code in sending a print instruction from the graphic engine 202 to the printer driver 203.

In the system shown in FIG. 2, the application 201 is released from print processing when the printer driver 203 has completely converted all print instructions from the graphic engine 202 into printer control commands.

In the system shown in FIG. 3, however, the application 201 is released from print processing when a spooler 302 has completely converted all print instructions into intermediate code data and output them to the spool file 303. That is, according to the system shown in FIG. 3, the application 201 is released from print processing in a short time. Additionally, in the system shown in FIG. 3, the contents of the spool file 303 can be processed. Hence, a function that is not provided by the application, for example, a function of reducing or enlarging print data from the application 201 or reducing and printing a plurality of pages into one page, can be realized.

Unlike the system shown in FIG. 2, the system shown in FIG. 3 is extended to spool intermediate code data. To process print data, normally, setting is done on a window provided by the printer driver 203, and the printer driver 203 saves the setting contents on the RAM 2 or external memory 11.

Print processing of the system shown in FIG. 3 will be described next in detail. As shown in FIG. 3, in this extended processing scheme, a DDI function as a print instruction from the graphic engine 202 is received by a dispatcher 301.

If the print instruction (DDI function) received from the graphic engine 202 is based on a print instruction (GDI function) issued from the application 201 to the graphic engine 202, the dispatcher 301 loads the spooler 302 stored in the external memory 11 into the RAM 2 and sends the print instruction (DDI function) not to the printer driver 203 but to the spooler 302.

The spooler 302 analyzes the received print instruction, converts the print instruction into an intermediate code for each page, and outputs the intermediate code data to the spool file 303. The spool file of the intermediate code stored for each page is called a PDF (Page Description File). The spooler 302 also acquires from the printer driver 203 process settings (bookbinding printing, Nup, double-side printing, stapling, color/monochrome, and the like) related to the print data set for the printer driver 203 and stores them in the spool file 303 as a file for each job. The setting file stored for each job is called a spool description file (to be referred to as an SDF). The spool description file will be described later in more detail.

The spool file 303 is generated as a file on the external memory 11. However, the spool file 303 may be generated on the RAM 2. The spooler 302 also loads a spool file manager 304 stored in the external memory 11 into the RAM 2 and notifies the spool file manager 304 of the generation situation of the spool file 303. After that, the spool file manager 304 determines on the basis of the contents of process settings related to the print data and stored in the spool file 303 whether printing can be performed.

If the spool file manager 304 determines that printing can be performed using the graphic engine 202, a despooler 305 stored in the external memory 11 is loaded into the RAM 2 and instructed to execute print processing of a page description file of an intermediate code described in the spool file 303. Then, the despooler 305 processes the page description file of the intermediate code contained in the spool file 303 in accordance with the spool description file containing process setting information and contained in the spool file 303, re-generates a GDI function, and outputs it through the graphic engine 202 again.

On the other hand, when the print instruction (DDI function) received from the graphic engine 202 is based on the print instruction (GDI function) issued from the despooler 305 to the graphic engine 202, the dispatcher 301 sends the print instruction not to the spooler 302 but to the printer driver 203. The printer driver 203 generates a printer control command formed from a page description language on the basis of the DDI function acquired from the graphic engine 202 and outputs the command to the printer 1500 through the system spooler 204.

In the example shown in FIG. 3, in addition to the extended system described above, a previewer 306 and setting change editor 307 are arranged to allow preview, print setting change, and combining of a plurality of jobs.

Figure 9:
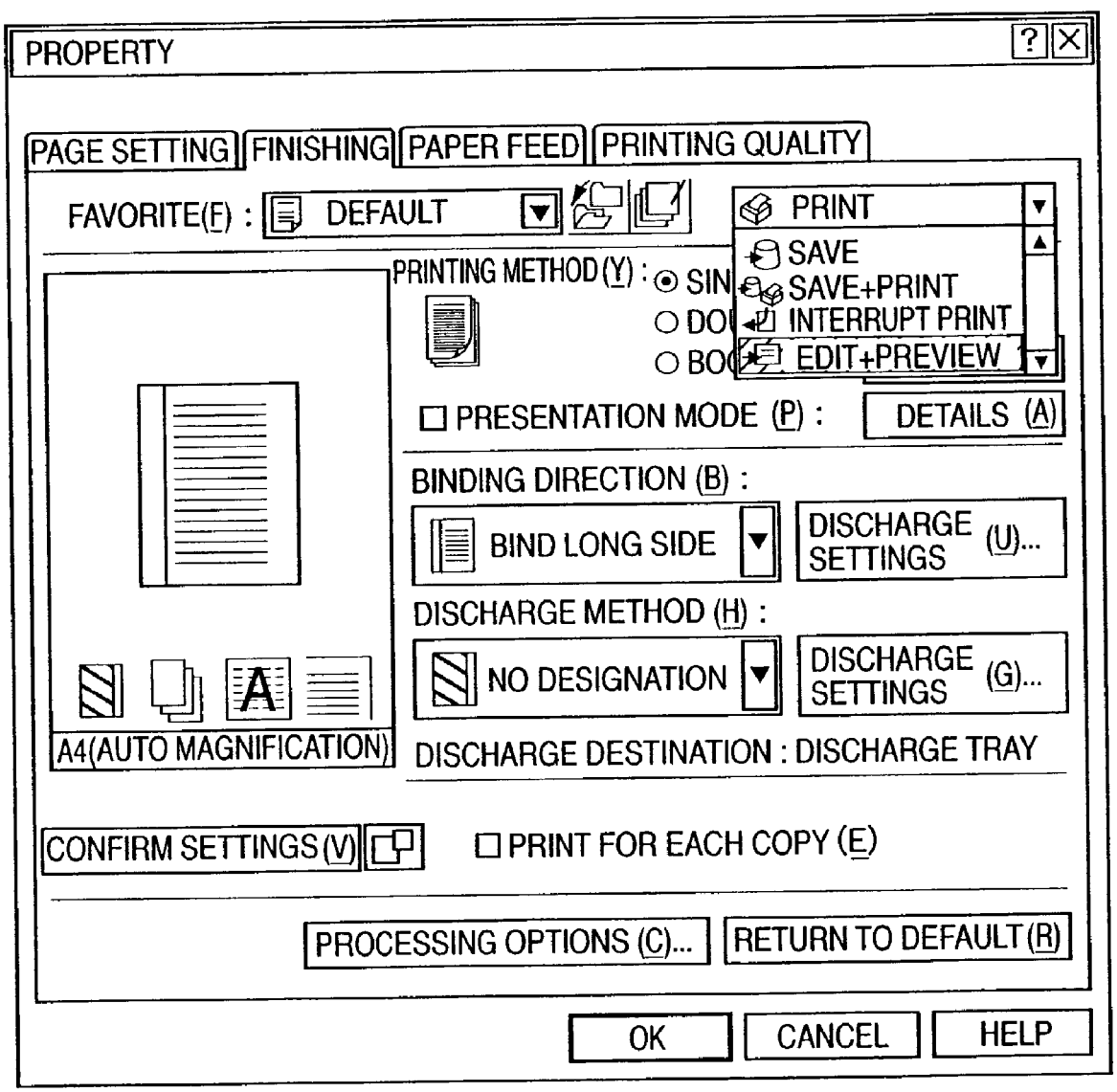
FIG. 9 is a view showing the property window of a printer driver.

To do print preview, change print settings, or combine a plurality of jobs, the user must designate "edit +preview" by a pull-down menu serving as a means for "designating an output destination" on the property window of the printer driver shown in FIG. 9.

Figure 16:
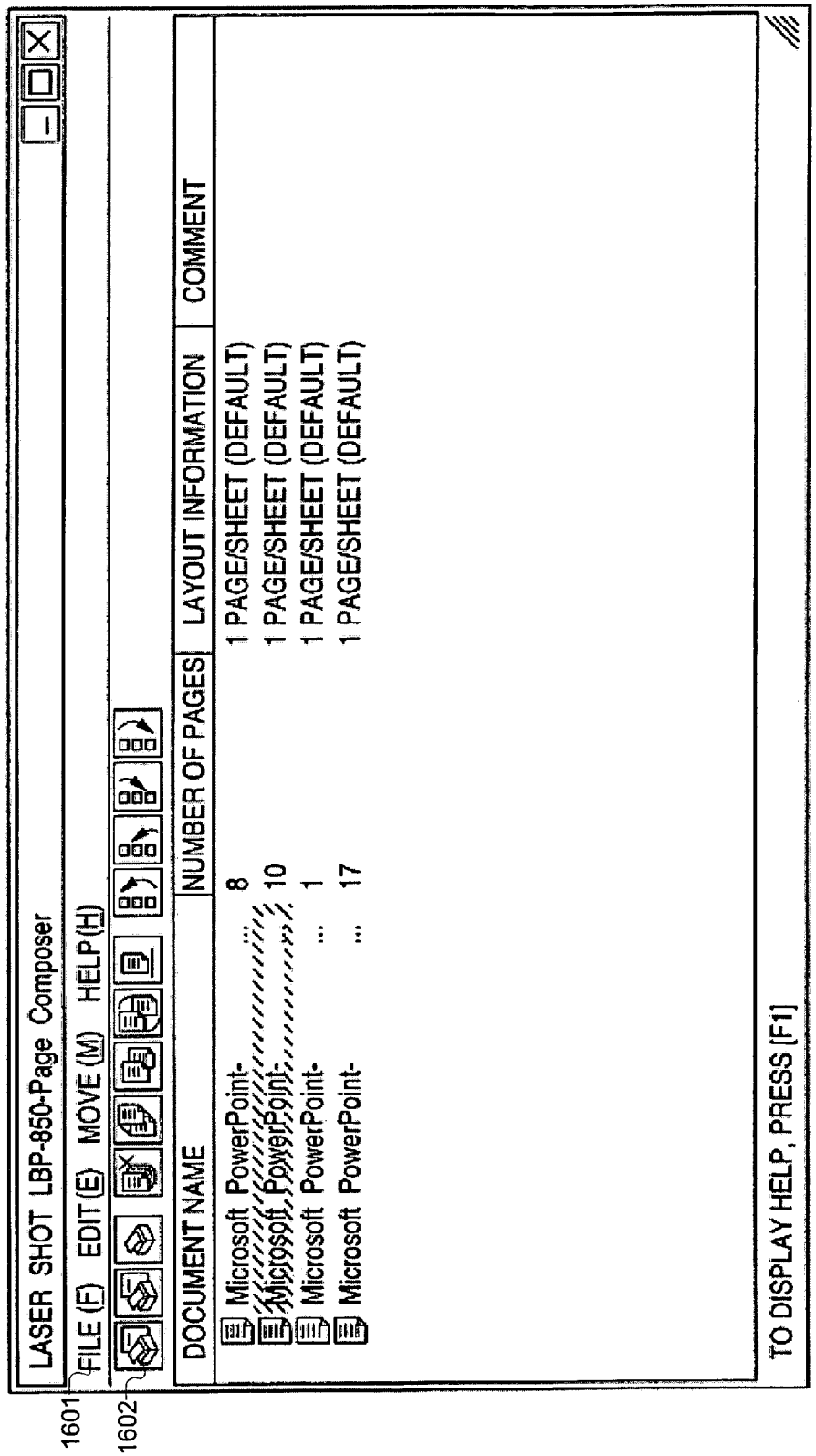
FIG. 16 is a view showing the window of the spool file manager.

The contents set in the property of the printer driver are stored in a structure (e.g., called DEVMODE in Windows) provided by the OS as a setting file. The structure contains, e.g., setting whether a file is to be stored in the spool file manager 304 during process setting contained in the spool file 303. When the spool file manager 304 loads process settings through the printer driver, and storage is designated, a page description file and spool description file are generated and stored in the spool file 303, as described above. As shown in FIG. 16, the window of the spool file manager pops up to display a list of jobs spooled in the spool file 303.

FIG. 16 shows an example in which four jobs are spooled. When a menu bar 1601 or a menu icon 1602 immediately under the menu bar 1601 is clicked on, the jobs can be operated. The number of operations on the menu bar 1601 equals the number of operations represented by the menu icons 1602. There are a total of 11 kinds of operations, i.e., "print" for printing while a job is being selected, "save and print" for printing while leaving a spool file of intermediate code, "preview" for checking the output preview of a job in consideration of process settings, "delete" for deleting a spool file of intermediate code, "copy" for generating a copy of a spool file of intermediate code, "combine" for combining jobs of a plurality of spool files of intermediate code into one job, "divide" for dividing a combined job into a plurality of original jobs, "job edit" for changing print settings (layout settings or finishing settings) of a single job or combined job, "move to first" for setting the printing order of a desired job to first, "advance job" for advancing the printing order of a desired job by one, "delay job" for delaying the printing order of a desired job by one, and "move to last" for setting the printing order of a desired job to last.

When the preview of a single job or combined job is designated on the window of the spool file manager shown in FIG. 16, the previewer 306 stored in the external memory 11 is loaded in the RAM 2 and instructed to execute preview processing of the job of the intermediate code described in the spool file 303.

The previewer 306 sequentially reads out the page description files (PDFs) of intermediate codes contained in the spool file 303, processes the PDFs in accordance with the contents of process setting information contained in the spool description file (SDF) stored in the spool file 303, and outputs a GDI function to the graphic engine 202. When the graphic engine 202 outputs rendering data to its client area, output onto the window can be performed.

The graphic engine 202 can appropriate rendering in accordance with a designated output destination. Hence, the previewer 306 can be implemented by processing an intermediate code contained in the spool file 303 in accordance with the contents of process setting contained in the spool file 303 and outputting the intermediate code using the graphic engine 202, like the despooler 305.

As described above, when process settings set for the printer driver 203 are stored in the spool file 303 as a spool description file, and the data of a page description file is processed and output on the basis of the spool description file, a print preview that indicates the actual manner the rendering data is to be printed, or a print preview that is closest to the result to be output by the printer can be presented to the user in accordance with each condition, e.g., whether Nup (N logical pages are reduced and laid out in one physical page and printed) is designated, bookbinding printing is designated, or stamping is designated.

In the preview function provided by conventional application software for creating a document or the like, rendering is executed on the basis of page setting in that application after all. For this reason, print settings by the printer driver 203 are not reflected, and the user cannot recognize the preview to be actually printed.

Figure 17:
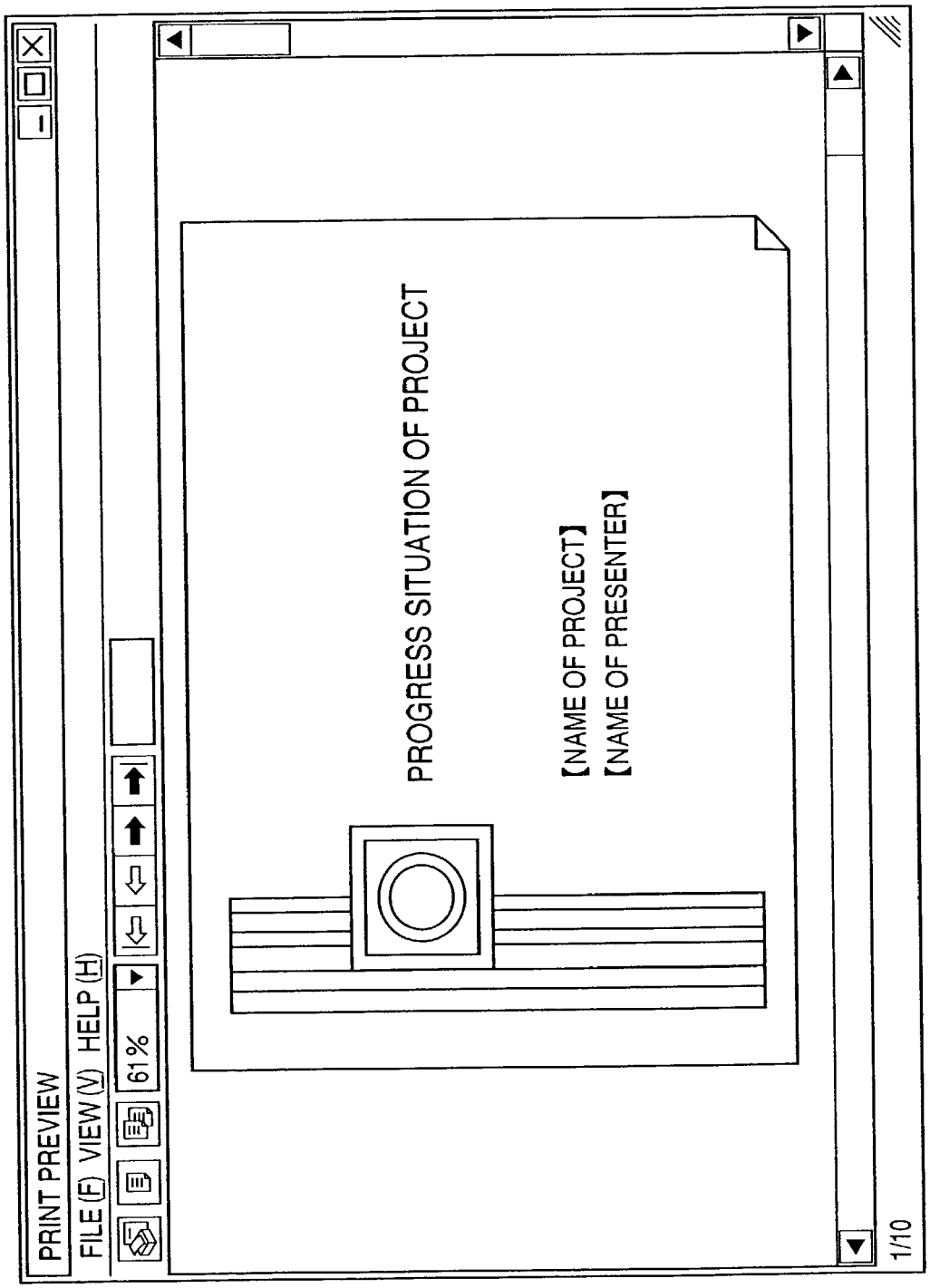
FIG. 17 is a view showing large preview of print process settings contained in a spool file 303.

When preview processing is executed in the above way, a large preview of process settings of printing contained in the spool file 303 is displayed on the window by the previewer 306, as shown in FIG. 17. After that, the previewer 306 is closed by user's OFF instruction. Then, control shifts to the window of the spool file manager shown in FIG. 16.

If the user wants to print in accordance with the contents displayed by the previewer 306, he instructs "print" or "save and print" on the window of the spool file manager 304, thereby issuing a print request. The despooler 305 processes the page description file on the basis of the spool description file to generate a GDI function. The print request is transmitted to the graphic engine 202. The print instruction is sent to the printer driver 203 through the dispatcher 301. Then, printing is executed.

A change in setting using the setting change editor 307 will be described next. The setting change editor 307 can be set for a job for which "edit+preview" is designated in FIG. 9, like the preview. With similar processing, the window of the spool file manager 304 pops up to display a list of spooled jobs. When "job edit" is designated on the window of the spool file manager 304, and setting change is instructed, the setting change editor 307 stored in the external memory 11 is loaded into the RAM 2 and instructed to display current or default process settings. A job setting window as shown in FIG. 18 is displayed.

Figure 18:
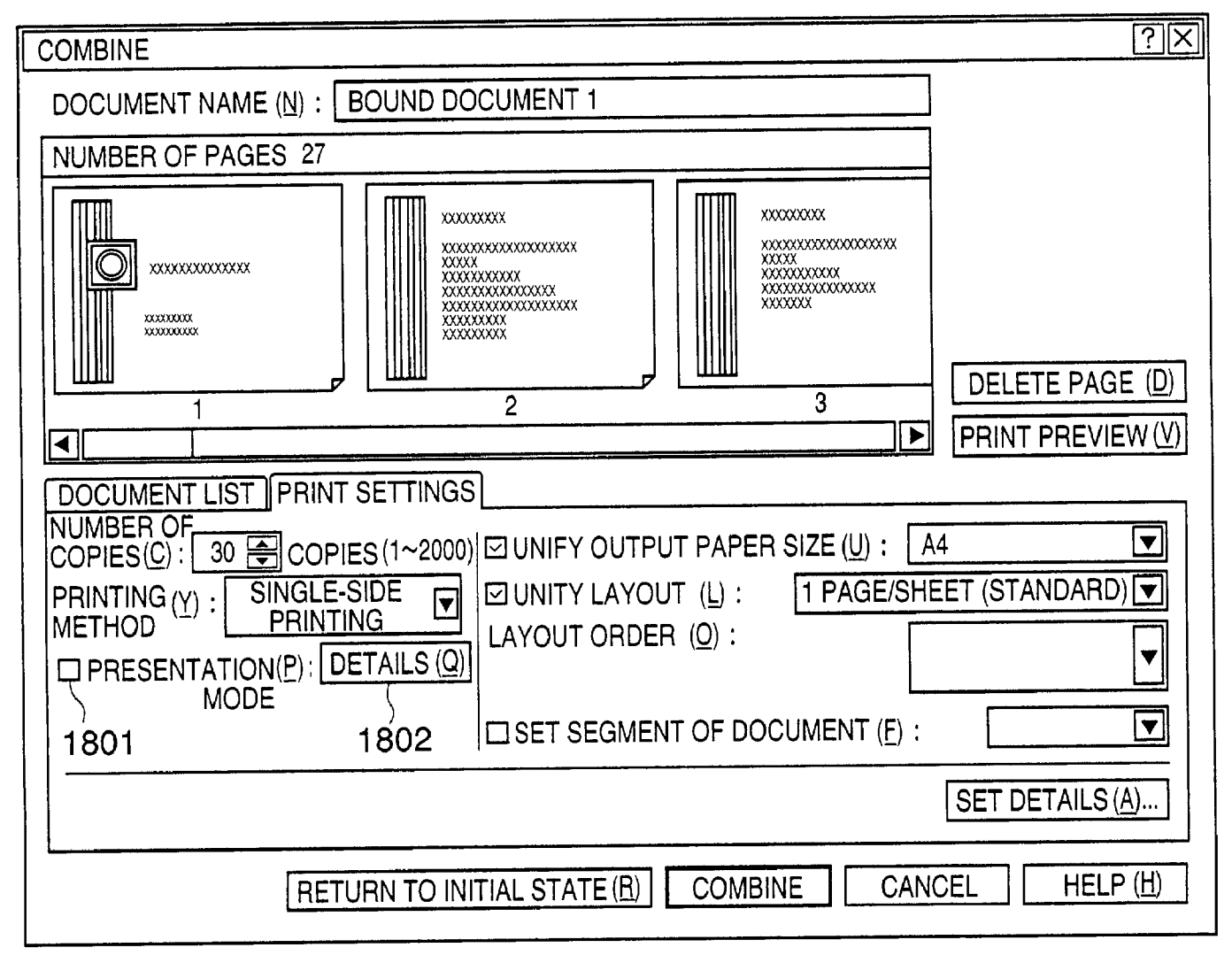

This setting change editor 307 acquires from the spool file 303 the spool description file of a job for which "job edit" is designated, and changes the default values of the job setting window shown in FIG. 18 on the basis of set items designated in the spool description file. In the example shown in FIG. 18, number of copies: 1, print mode: single-side, layout: 1 page/sheet, and the like are designated.

Even in this setting change editor 307, when the page description file of the intermediate code contained in the spool file 303 is processed in accordance with the contents of process settings contained in the spool description file stored in the spool file 303 and output to the client area of its own using the graphic engine 202, small preview output onto the window shown in FIG. 18 can be performed.

The contents of process settings contained in the spool description file stored in the spool file 303 can be changed or corrected. To do this, items that can be set by the printer driver 203 may be prepared in the user interface on the setting change editor 307. Alternatively, the user interface of the printer driver 203 itself may be invoked.

As shown in FIG. 18, the number of copies, print mode (single-side, double-side, bookbinding printing), page layout, arrangement order, and the like can be designated. When "detail setting" is clicked on, most of items that can be designated by the printer driver can be re-set. However, the setting change of items related to the printing quality, including resolution and graphic mode, is not permitted.

For the changed items, the change is approved in accordance with the approval request on the setting change editor 307. Control shifts to the spool file manager 304. For the items whose change has been approved, the change in print settings is saved. It is saved not in the original spool description file but in a newly created job output setting file used for job editing or the like. The job output setting file will be described later in detail with reference to FIG. 10 and subsequent drawings.

When the user confirms the change on the previewer 306 and wants to print in accordance with the changed setting contents, he issues a print request on the spool file manager 304. The print request is transmitted to the graphic engine 202. A print instruction is sent to the printer driver 203 through the dispatcher 301. Then, printing is executed.

On the window of the spool file manager 304 shown in FIG. 16, designation can be done to combine a plurality of print jobs and print them as one print job. This designation also premises a job for which "edit+preview" is designated as an output destination in the property of the printer driver shown in FIG. 9.

When the user wants to combine print jobs, he invokes the application 201 from the printer driver 203 and selects "edit+preview" on the user interface as shown in FIG. 9. As in the above-described case, with this selection, the window of the spool file manager pops up, as shown in FIG. 16. Spooled jobs are displayed as a list on the window of the spool file manager 304. When the same operation as described above is performed from the application 201, a list of a plurality of jobs is displayed on the spool file manager 304.

When a plurality of jobs are selected, and "combine" is designated, the setting change editor 307 stored in the external memory 11 is loaded into the RAM 2 and instructed to display process settings of the first job on the list of default process settings. A combining setting window as shown in FIG. 18 is displayed. In this case, the job setting window of the setting change editor 307 is used as the combining setting window. However, another module may be used.

This setting change editor 307 processes the page description file of the intermediate code contained in the spool file 303 in accordance with the contents of process settings contained in the job setting information stored in the spool file 303 and outputs the page description file to the client area of its own using the graphic engine 202 for all jobs designated as jobs to be combined, thereby outputting an image on the window. At this time, small previews of all jobs selected can be displayed in the preview area shown in FIG. 18. When a combined job is to be generated, a job output setting file is generated by extending the spool description file of each job. The job output setting file is generated even when job editing is executed. One job output setting file is generated for one job. In addition, one job output setting file is generated for one combined job.

Process settings for each job before combining or those changed or corrected to process settings integrated for the combined job may be displayed. To do this, items that can be set by the printer driver 203 may be prepared in the user interface on the setting change editor 307. Alternatively, the user interface of the printer driver 203 itself may be invoked.

For the combined job and changed items, the change is approved in accordance with the approval request on the setting change editor 307, as described above. Control shifts to the spool file manager 304. With these operations, the plurality of selected jobs are displayed as one combined job on the window of the spool file manager.

When the user confirms the change on the previewer 306 and wants to print in accordance with the changed setting contents, he issues a print request on the spool file manager 304. The print, request is transmitted to the graphic engine 202. A print instruction is sent to the printer driver 203 through the dispatcher 301. Then, printing is executed.

The structure of the printer 1500 of this embodiment, which executes printing on the basis of a printer control command input from the printer driver 203 through the system spooler 204, will be described next.

Figure 4:
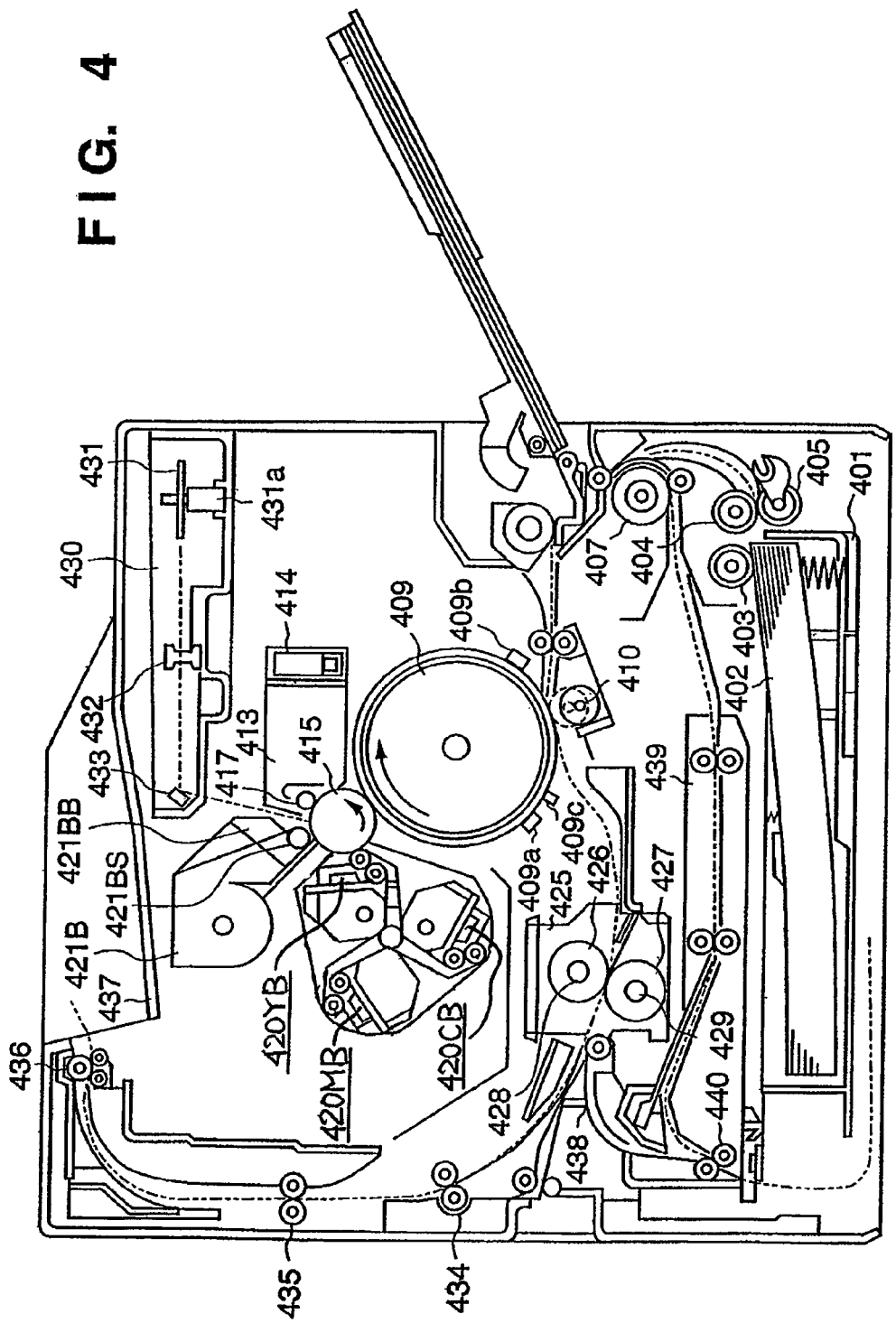
FIG. 4 is a sectional view showing the structure of a printer according to the embodiment.

FIG. 4 is a sectional view showing the structure of the printer of this embodiment. As an example of the printer 1500, a color laser printer having a double-side printing function will be described here.

As shown in FIG. 4, in this printer, a laser beam modulated in accordance with image data of each color obtained on the basis of print data input by the host computer 3000 scans a photosensitive drum 415 through a polygon mirror 431, thereby forming an electrostatic latent image. This electrostatic latent image is developed by toner to obtain a visible image. A multiple of visible images for all colors are transferred onto an intermediate transfer body 409, thereby forming a color visible image. The color visible image is further transferred onto a transfer member 402 and fixed on the transfer member 402.

An image forming section which executes the above control is constructed by a drum unit 413 having the photosensitive drum 415, a primary charging section having a contact charge roller 417, a cleaning section, a developing section, the intermediate transfer body 409, a paper feed section including a paper cassette 401 and various kinds of rollers 403, 404, 405, and 407, a transfer section including a transfer roller 410, and a fixing section 425.

The drum unit 413 is formed by integrating the photosensitive drum (photosensitive body) 415 and a cleaner container 414 having a cleaning mechanism which also serves as the holder of the photosensitive drum 415. The drum unit 413 is supported to be detachable from the printer main body. The drum unit 413 can easily be exchanged in accordance with the service life of the photosensitive drum 415. The photosensitive drum 415 is formed by coating the outer surface of an aluminum cylinder with an organic photoconductive layer and rotatably supported by the cleaner container 414. The photosensitive drum 415 rotates upon receiving a driving force from a drive motor (not shown). The drive motor rotates the photosensitive drum 415 counterclockwise in accordance with image forming operation. When the surface of the photosensitive drum 415 is selectively exposed, an electrostatic latent image is formed.

In the scanner section 430, a modulated laser beam is reflected by the polygon mirror 431 which is rotated by a motor 431a in synchronism with a horizontal sync signal of an image signal so that the photosensitive drum 415 is irradiated with the laser beam through a lens 432 and reflecting mirror 433.

To convert the electrostatic latent image into a visible image, the developing section has three color developing units 420Y, 420M, and 420C which develop yellow (Y), magenta (M), and cyan (C) images, and one black developing unit 421B which develops a black (B) image. The color developing units 420Y, 420M, and 420C and black developing unit 421B have sleeves 420YS, 420MS, 420CS, and 421BS and coating blades 420YB, 420MB, 420CB, and 421BB which are pressed against the outer surfaces of the sleeves 420YS, 420MS, 420CS, and 421BS, respectively. The three color developing units 420Y, 420M, and 420C have coating rollers 420YR, 420MR, and 420CR, respectively.

The black developing unit 421B is detachably attached to the printer main body. The color developing units 420Y, 420M, and 420C are detachable attached to a developing rotary 423 which rotates about a rotating shaft 422.

The sleeve 421BS of the black developing unit 421B is arranged at a small interval of, e.g., about 300 μm with respect to the photosensitive drum 415. The black developing unit 421B conveys toner by an internal convey member and applies electrical charges to the toner by frictional charging such that the toner is coated by the coating blade 421BB on the outer surface of the sleeve 421BS which rotates clockwise. When a developing bias is applied to the sleeve 421BS, the electrostatic latent image is developed on the photosensitive drum 415 to form a visible image on the photosensitive drum 415 by black toner.

The three color developing units 420Y, 420M, and 420C rotate as the developing rotary 423 rotates in forming an image. A predetermined one of the sleeves 420YS, 420MS, and 420CS opposes the photosensitive drum 415 at a small interval of about 300 µm. With this arrangement, a predetermined one of the color developing units 420Y, 420M, and 420C stops at a developing position opposing the photosensitive drum 415, so a visible image is formed on the photosensitive drum 415.

In forming a color image, the developing rotary 423 rotates as the intermediate transfer body 409 rotates by one revolution. The developing process is executed in the order of yellow developing unit 420Y, magenta developing unit 420M, cyan developing unit 420C, and black developing unit 421B. When the intermediate transfer body 409 rotates by four revolutions, visible images by yellow, magenta, cyan, and black toners are sequentially formed. Consequently, a full-color visible image is formed on the intermediate transfer body 409.

The intermediate transfer body 409 is designed to come into contact with the photosensitive drum 415 and rotate as the photosensitive drum 415 rotates. In forming a color image, the intermediate transfer body 409 rotates clockwise to receive multiple transfer of four visible images from the photosensitive drum 415. Additionally, in forming a color image, the transfer roller 410 (to be described later) comes into contact with the intermediate transfer body 409 to sandwich and convey the transfer member 402, thereby simultaneously multiple-transferring the color visible images on the intermediate transfer body 409 onto the transfer member 402. A TOP sensor 409a and RS sensor 409b, which detect the position of the intermediate transfer body 409 in the rotational direction, and a density sensor 409c which detects the density of the toner image transferred to the intermediate transfer body 409 are arranged at the outer peripheral portion of the intermediate transfer body 409.

The transfer roller 410 has a transfer charger supported to come close to or separate from the intermediate transfer body 409. The transfer roller 410 is formed by winding a medium-resistive foam elastic body around a metal shaft. While color visible images are being multiple-transferred onto the intermediate transfer body 409, the transfer roller 410 separates downward not to disturb the color visible images, as indicated by a solid line in FIG. 4. After the four color visible images are formed on the intermediate transfer body 409, the transfer roller 410 is located at the upper position indicated by a dotted line in FIG. 4 by a cam member (not shown) in synchronism with the transfer timing of the color visible images onto the transfer member 402. With this operation, the transfer roller 410 is pressed against the intermediate transfer body 409 by a predetermined press force via the transfer member 402. Simultaneously, a bias voltage is applied to the transfer roller 410. Hence, the color visible images on the intermediate transfer body 409 are transferred onto the transfer member 402.

The fixing section 425 fixes the transferred color visible images while conveying the transfer member 402. The fixing section 425 has a fixing roller 426 for heating the transfer member 402 and a press roller 427 for pressing the transfer member 402 against the fixing roller 426. The fixing roller 426 and press roller 427 are hollow rollers and incorporate heaters 428 and 429, respectively. That is, the transfer member 402 which holds the color visible images is conveyed by the fixing roller 426 and press roller 427 and simultaneously heated and pressed to fix the toner on the surface of the transfer member 402.

After the visible images are fixed, the transfer member 402 is discharged to a discharge section 437 by discharge rollers 434, 435, and 436. Thus, the image forming operation is ended.

The cleaning means cleans the toner that remains on the photosensitive drum 415 and intermediate transfer body 409. Waste toner that remains after a visible image formed on the photosensitive drum 415 by toner is transferred onto the intermediate transfer body 409 or waste toner that remains after four color visible images formed on the intermediate transfer body 409 are transferred onto the transfer member 402 is stored in the cleaner container 414.

The transfer member (printing paper sheet) 402 to be printed is picked up from the paper feed tray 401 by the paper feed roller 403. Color toner images are printed on the printing paper sheet which is sandwiched between the intermediate transfer body 409 and the transfer roller 410 and conveyed. As the printing paper sheet passes through the fixing section 425, the toner images are fixed. In a single-side print mode, a convey path is formed such that a guide 438 guides the printing paper sheet to the discharge section 437 on the upper side. In a double-side print mode, a path is formed to guide the printing paper sheet to a double-side printing unit on the lower side.

The printing paper sheet guided to the double-side printing unit is temporarily sent to the lower side of the tray 401 (convey path indicated by a chain double-dashed line) by a convey roller 440 and then conveyed in a reverse direction to a double-side tray 439. On the double-side tray 439, the paper sheet is turned over from those placed in the paper cassette 401. The convey direction is also reversed. In this state, toner images are transferred and fixed again, thereby completing double-side printing.

A generation process by the spooler 302, in which the above-described spooler 302 receives a print request from the application 201 through the graphic engine 202 and dispatcher 301, analyzes the print request, and converts print data into an intermediate code for each page, thereby generating a spool file, will be described.

Figure 5:
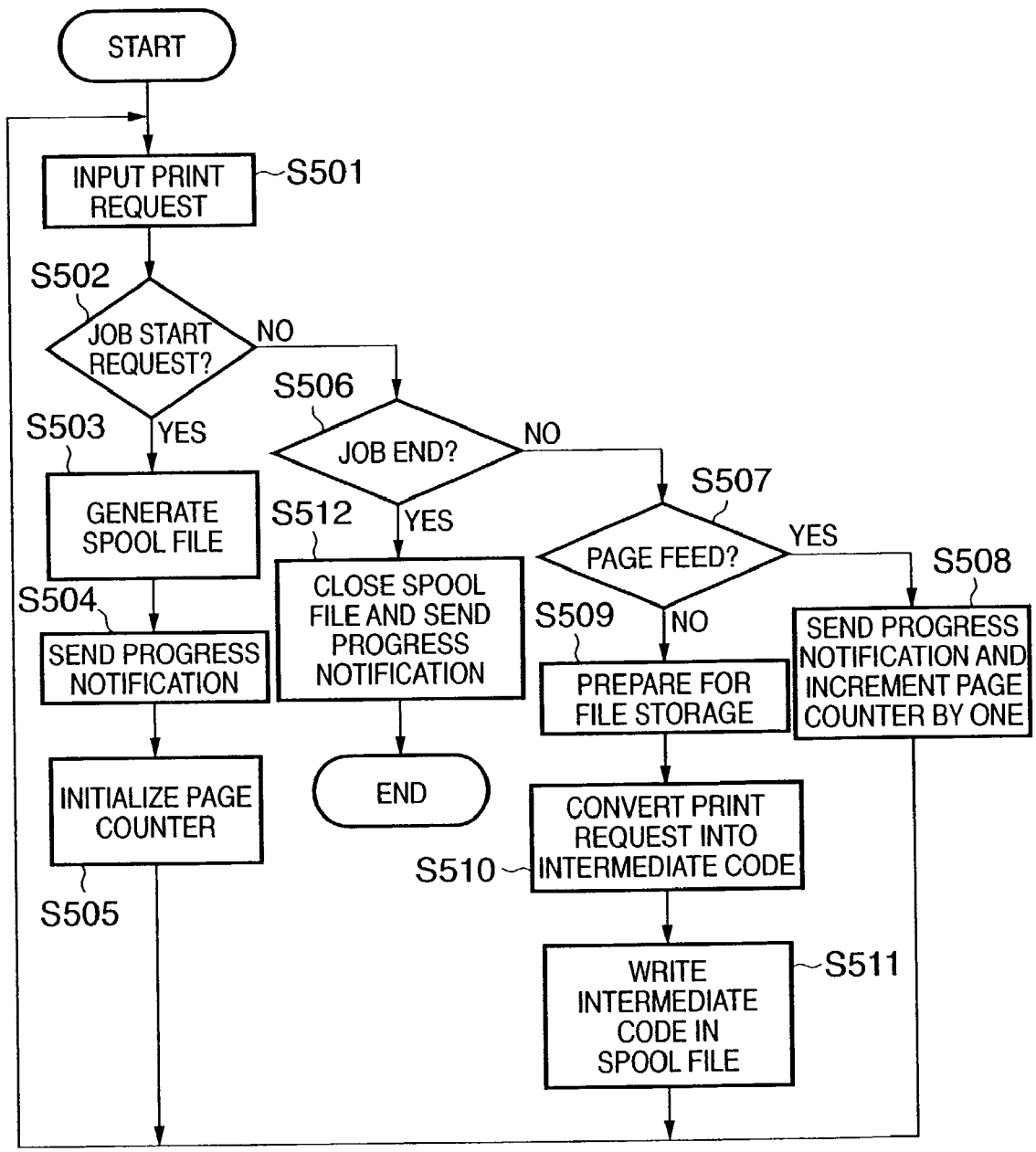
FIG. 5 is a flow chart showing a generation process by a spooler 302.
Figure 8:
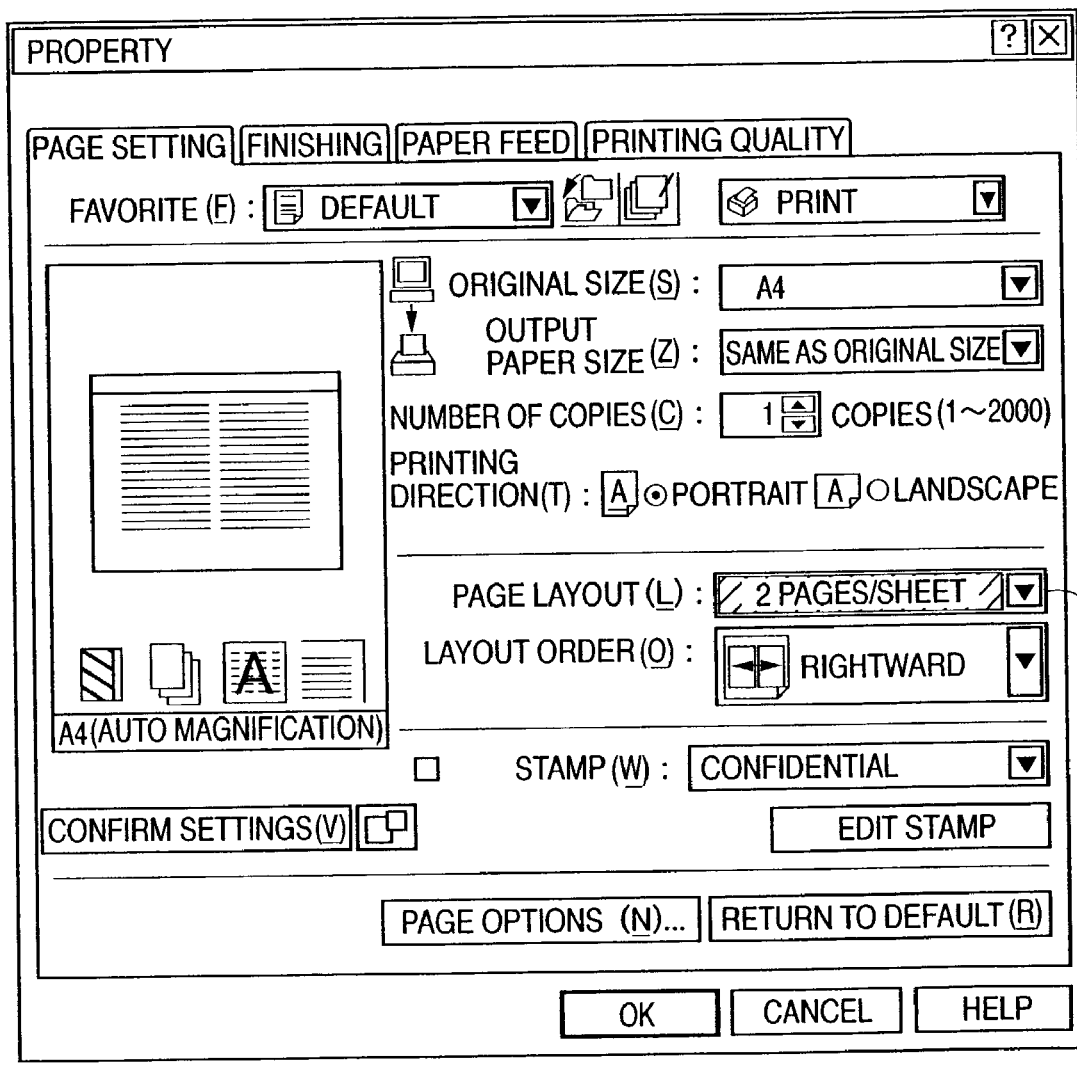
FIG. 8 is a view showing a dialogue for inputting print settings.

FIG. 5 is a flow chart showing a generation process by the spooler 302. First, in step S501, the spooler 302 receives a print request from the application 201 through the graphic engine 202 and dispatcher 301. In the application 201, a dialogue for inputting print settings as shown in FIG. 8 is displayed. Print settings input from this dialogue are transferred to the spooler 302 through the printer driver 203. The setting input dialogue shown in FIG. 8 includes a setting item for determining the number of logical pages to be laid out in one physical page, as indicated by 801.

In step S502, the spooler 302 determines whether the received print request is a job start request. If YES in step S502, the flow advances to step S503. The spooler 302 generates the spool file 303 to temporarily store intermediate data. In step S504, the spooler 302 notifies the spool file manager 304 of the progress of print processing. In step S505, the page counter of the spooler 302 is initialized to "1". The spool file manager 304 loads and stores, from the spool file 303, job setting information and process settings for the job that has started printing.

If NO in step S502, the flow advances to step S506. The spooler 302 determines whether the received request is a job end request. If NO in step S506, the flow advances to step S507 to determine whether page feed is designated. If YES in step S507, the flow advances to step S508 to notify the spool file manager 304 of the progress of print processing, increment the page counter by one, close the page description file that stores the intermediate code, and generate the next page description file.

If NO in step S507, the flow advances to step S509. The spooler 302 prepares for a write of the intermediate code in a page description file. In step S510, to store the print request in the spool file 303, the spooler 302 converts the DDI function of the print request into an intermediate code. In step S511, the spooler 302 writes the print request (intermediate code) converted into a storable form in step S510 in the page description file of the spool file 303. The flow returns to step S501 to receive a print request from the application 201 again.

The series of processes in steps S501 to S511 are continued until a job end request (End Doc) is received from the application 201. Simultaneously, the spooler 302 acquires pieces of information such as process settings stored in a DEVMODE structure from the printer driver 203 and stores them in the spool file 303 as a spool description file. If YES in step S506, the flow advances to step S512 because all print requests from the application 201 are ended. The spool file manager 304 is notified of the progress of print processing, and the processing is ended.

A process for causing the spool file manager 304 to receive progress notification from the spooler 302 or despooler 305 and control the generation process by the spooler 302 and a print data generation process (to be described later) by the despooler 305 will be described next.

Figure 6:
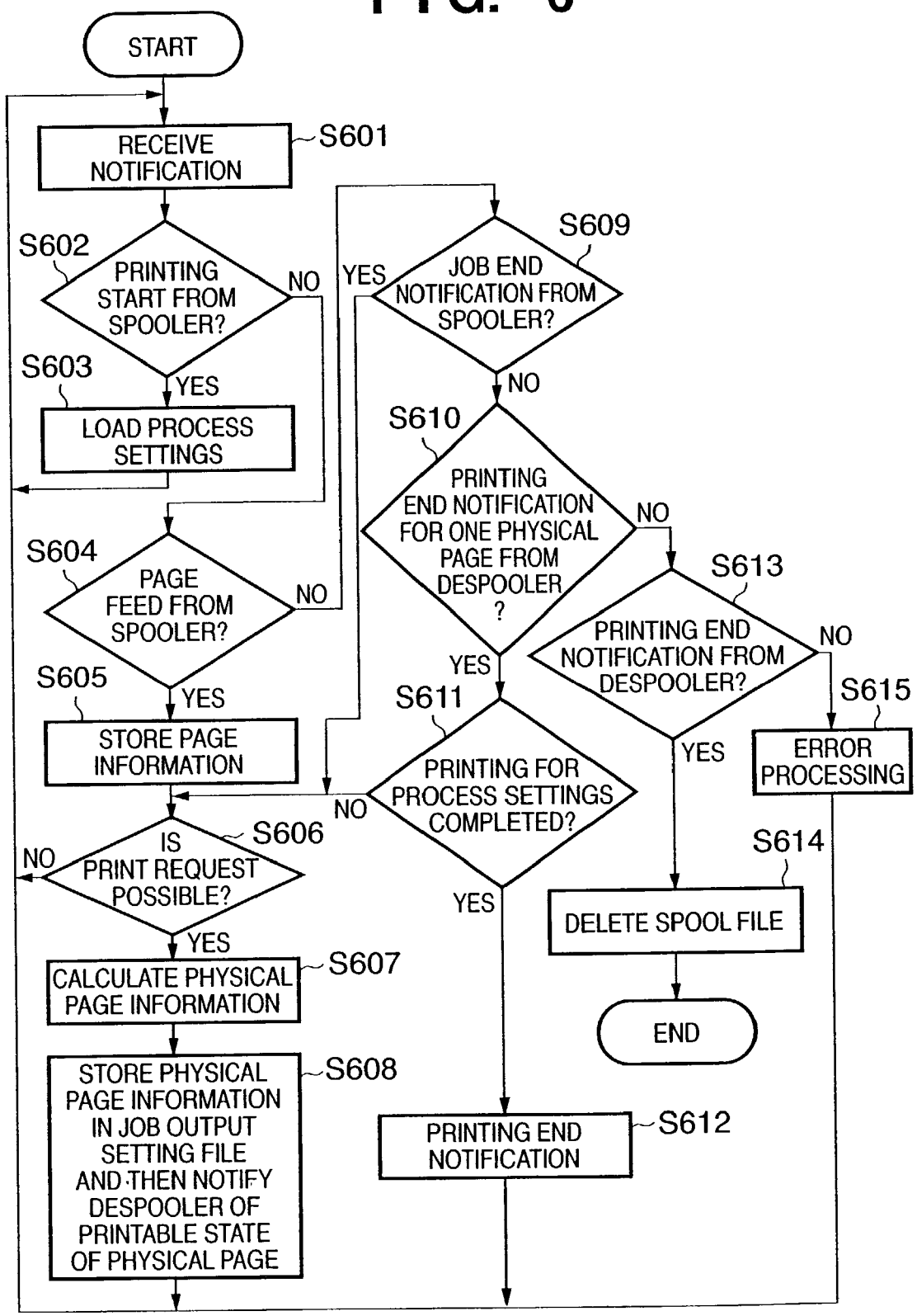
FIG. 6 is a flow chart showing control by a spool file manager 304.

FIG. 6 is a flow chart showing control by the spool file manager 304. First, in step S601, the spool file manager 304 receives a print processing progress notification from the spooler 302 or despooler 305. In step S602, the spool file manager 304 determines whether the progress notification is a printing start notification from the spooler 302, which is sent in step S504 of FIG. 5. If YES in step S602, the flow advances to step S603 to load process settings for printing from the spool file 303 and start managing a job.

If NO in step S602, the flow advances to step S604. The spool file manager 304 determines whether the progress notification is a notification of the end of printing (page feed) of one logical page, which is sent from the spooler 302 in step S508 of FIG. 5. If YES in step S604, the flow advances to step S605 to store logical page information corresponding to the logical page. It is determined in step S606 whether printing of one physical page can start for n logical pages that have been spooled. If YES in step S606, the flow advances to step S607 to determine the physical page number from the number of logical pages assigned to one physical page to be printed.

For this physical page calculation, assume that a process setting is done to lay out, e.g., four logical pages in one physical page, as shown in FIG. 8. The first physical page can be printed when the fourth logical page is spooled. Similarly, the second physical page can be printed when the eighth logical page is spooled.

Even when the total number of logical pages is not a multiple of the number of logical pages laid out in one physical page, logical pages to be laid out in one physical page can be determined by the spool end notification in step S512 of FIG. 5.

In step S608, pieces of information including the numbers of logical pages that construct the printable physical page and the physical page number are stored in a job output setting file (a file containing physical page information) by a format as shown in FIG. 10. The despooler 305 is notified that physical page information corresponding to one physical page is added. After that, the flow returns to step S601 to wait for the next notification. The job output setting file will be described later in more detail with reference to FIG. 10.

As described above, in this embodiment, even when a print job is not completely spooled, print processing can be performed when logical pages that construct one physical page are spooled.

If NO in step S604, the flow advances to step S609. The spool file manager 304 determines whether the notification is a job end notification from the spooler 302, which is sent in step S512 of FIG. 5. If YES in step S609, the flow advances to step S606 described above. If NO in step S609, the flow advances to step S610. The spool file manager 304 determines whether the received notification is a printing end notification of one physical page from the despooler 305. If YES in step S610, the flow advances to step S611 to determine whether printing for the process settings is completed. If YES in step S611, the flow advances to step S612 to notify the despooler 305 of the end of printing. If NO in step S611, the flow advances to step S606 described above.

The despooler 305 of this embodiment presumes one physical page as a unit of print processing. In step S608 described above, pieces of information necessary for print processing of one physical page are successively stored in a file such that they can be reused. If reuse is unnecessary, a high-speed medium such as a shared memory may used to sequentially overwrite information for each physical page so as to increase the speed and save the resource. If the speed of progress of the spooler 302 is higher than that of the despooler 305, or if the despooler 305 starts after all pages are spooled, the despooler 305 need not always be notified of the page printable state for each physical page in step S608. Instead, in accordance with the progress on the despooler 305 side, the despooler 305 may be notified that a plurality of physical pages or all physical pages are printable such that the number of times of notification can be decreased.

If NO in step S610, the flow advances to step S613. The spool file manager 304 determines whether the notification is a printing end notification from the despooler 305. If YES in step S613, the flow advances to step S614. The spool file manager 304 deletes the corresponding page description file of the spool file 303, and the processing is ended. If NO in step S613, the flow advances to step S615 to execute another normal processing (e.g., error processing) and wait for the next notification.

A print data generation process of causing the despooler 305 to read out necessary information (page description file, spool description file, and the like) from the spool file 303 in accordance with a print request from the spool file manager 304 and generates print data will be described next. The method of transferring generated print data to the printer 1500 is the same as that described with reference to FIG. 3.

Figure 7:
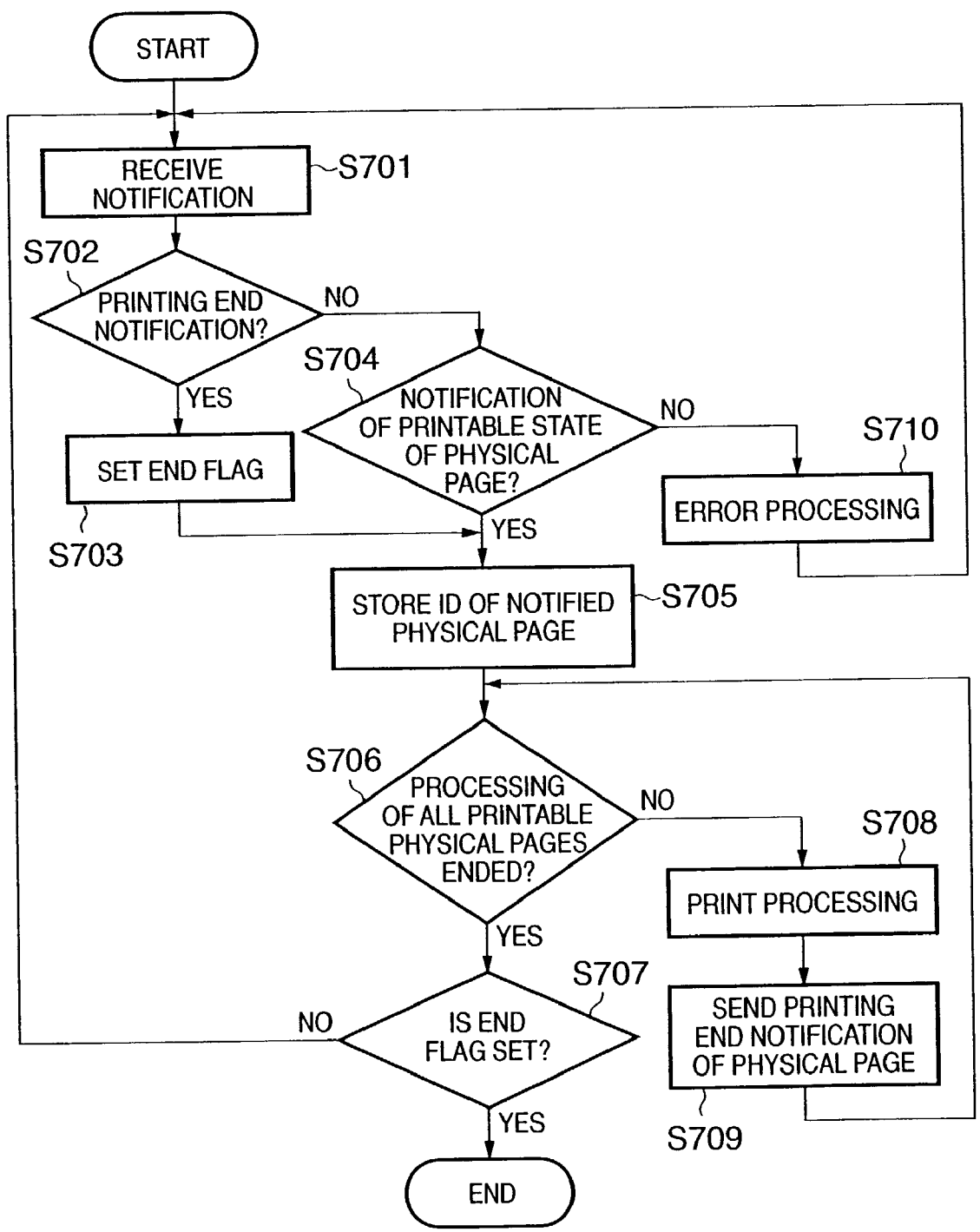
FIG. 7 is a flow chart showing a print data generation process by a despooler 305.

FIG. 7 is a flow chart showing the print data generation process by the despooler 305. First, in step S701, a notification from the spool file manager 304 is received. In step S702, the despooler 305 determines whether the received notification is a job end notification. If YES in step S702, the flow advances to step S703 to set an end flag. The flow then advances to step S705.

If NO in step S702, the flow advances to step S704 to determine whether the notification if a printing start request for one physical page, which is sent in step S608 of FIG. 6. If NO in step S704, the flow advances to step S710 to execute another processing (error processing). The flow returns to step S701 to wait for the next notification. If YES in step S704, the flow advances to step S705. The despooler 305 stores the ID of the printable physical page that is received in step S704. In step S706, the despooler 305 determines whether print processing of all pages for the physical page IDs stored in step S705 is ended. If YES in step S706, the flow advances to step S707 to determine whether the end flag has been set in step S703. If YES in step S707, it is regarded that the job is ended. The spool file manager 304 is notified that the processing by the despooler 305 is ended, and the processing is ended. If NO in step S707, the flow returns to step S701 to wait for the next notification.

If NO in step S706, the flow advances to step S708. The despooler 305 sequentially reads out unprocessed physical page IDs from the stored physical page IDs. The despooler 305 loads information necessary for generating print data of a physical page corresponding to each readout physical page ID and executes print processing. In this print processing, the despooler 305 converts the print request instruction stored in the spool file 303 into a format (GDI function) that can be recognized by the graphic engine 202 and transfers the GDI function.

For a process setting (to be referred to as "N page printing" hereinafter) for laying out a plurality of logical pages in one physical page, the print request instruction is converted in step S708 in consideration of reduction layout. When necessary print processing is ended, the spool file manager 304 is notified of the end of print data generation for one physical page in step S709. The flow returns to step S706. These processes are repeated until print processing for all printable physical page IDs stored in step S705 described above is ended.

As described above, since print processing is executed by the dispatcher 301, spooler 302, spool file manager 304, and despooler 305, the application 201 is released from print processing at a timing when the spooler 302 generates an intermediate code and stores it in the spool file 303. Hence, the processing time can be shortened as compared to conventional print processing in which print data is directly output to the printer driver 203.

In addition, an intermediate file (page description file and spool description file) which takes print settings of the printer driver into consideration is temporarily stored in the spool file 303. Hence, the user can recognize a print preview to be actually printed. Also, print jobs generated by a plurality of applications 201 can be combined or rearranged. Print settings can be changed by the user without activating the application 201 again to execute printing.

In print processing using the spooler 302, a job output setting file is generated by the despooler 305 when a print request is issued to the graphic engine 202. Even when preview or job combining is performed, a job output setting file is generated. This job output setting file is the same as a spool description file for a single job. For a combined job, the job output setting file is generated on the basis of a plurality of pieces of job setting information.

The job output setting file of this embodiment will be described below.

FIG. 10 is a view showing a job output setting file in this embodiment. This job output setting file stores information of a printable physical page generated by the spool file manager 304 in step S608 of FIG. 6. Referring to FIG. 10, an ID used to identify a job is stored in a field 1001. The ID may be held in a form such as the name of a file that stores the information or the name of a shared memory. Job setting information is stored in a field 1002. The job setting information contains a structure necessary for starting printing the job for the graphic engine 202, designation of N page printing, designation of additional rendering of a page frame or the like, the number of copies, and finishing designation such as stapling. These pieces of information can be set only in a one-to-one correspondence to a job. In the job setting information, only necessary pieces of information are stored in accordance with the function to the job.

The number of physical pages of the job is stored in a field 1003, which indicates that pieces of physical page information corresponding to the number are stored after this field. In this embodiment, since a notification of the number of printable physical pages is sent, the field 1003 may be omitted. After this field, pieces of physical page information corresponding to the number of physical pages stored in the field 1003 are stored from a field 1004. The physical page information will be described later in more detail with reference to FIG. 12.

FIG. 11 is a view showing job setting information in the field 1002 shown in FIG. 10. Referring to FIG. 11, the total number of physical pages is stored in a field 1101. The total number of logical pages is stored in a field 1102. The information in the fields 1101 and 1102 can be added to print data and used when, e.g., the number of pages is printed as additional information. While printing continues, these fields store temporary values. Alternatively, until printing is ended, the spool file manager 304 postpones generating information of printable physical pages. Information of the number of copies, which designates the number of copies to be printed by a print job, is stored in a field 1103. When printing of a plurality of copies is set in the field 1103, designation whether printing is to be executed for each copy is stored in a field 1104. Finishing information such as stapling, punching, or Z-folding is stored in a field 1105. This information is designated when the printer has a finisher in or outside the main body. Additional information including decoration such as a page frame and a date and information to be added to the print job, such as the user name, the number of pages, and digital watermark are stored in a field 1106. As the number of function increases, the number of fields contained in the job setting information also increases. For example, when double-side printing is possible, a field for storing designation of double-side printing is added.

Figure 12:
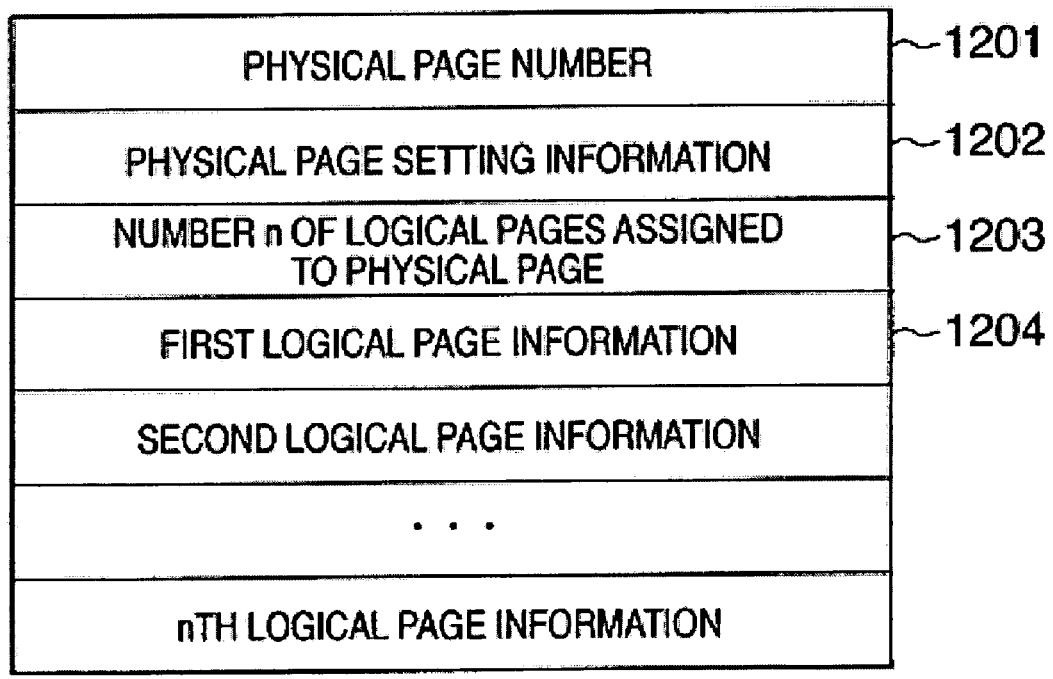
FIG. 12 is a view showing physical page information in a field 1004 shown in FIG. 10.

FIG. 12 is a view showing physical page information in the field 1004 shown in FIG. 10. Referring to FIG. 12, a physical page number is stored in a first field 1201. That is, a value used to manage the printing order or additionally print a physical page number is stored. Physical page setting information is stored in a field 1202. When layout or a color/monochrome mode can be designated for each physical page, the setting of layout or a color/monochrome mode is stored. The number of logical pages assigned to a physical page is stored in a field 1203. When four pages are assigned to one physical page, "4" or an ID that indicates 4-page printing is stored. Pieces of logical page information corresponding to the number designated in the field 1203 are stored from a field 1204.

In some cases, the actual number of page data is smaller than the number of pages designated in the field 1203 because of the number of pages printed from the application 201. In such case, special data that indicates a blank page is stored as logical page information.

FIG. 13 is a view showing physical page setting information in the field 1202 shown in FIG. 12. Referring to FIG. 13, the layout order of logical pages on a physical page is stored in a field 1301. For N page printing, designation of the order of laying out logical pages on a physical page (e.g., rightward or downward from the upper left) is stored. For a system of certain kind, instead of storing the layout order, the pieces of logical page information from the field 1204 are arranged not in the order of page number but in an order corresponding to the layout order as a substitute for the setting in the field 1301. Information representing an upper or lower surface in the double-side print mode is stored in a field 1302. This information is used to, e.g., align the binding margin on the upper and lower surfaces. Designation of a color page or monochrome page is stored in a field 1303. This information is used when the printer has a monochrome mode and color mode, and a document made up from both color and monochrome pages is to be printed by printing a color page in the color mode and a monochrome page in the monochrome mode. When this information is present, processing by a color printer can be changed for each page in an auto-color mode. More specifically, for a color page, the intermediate transfer body (intermediate transfer drum and intermediate transfer belt) or transfer member rotates by the number of device colors, i.e., four revolution for YMCK. For a monochrome page, the intermediate transfer body or transfer member rotates by only one revolution for black, thereby controlling transfer. Additional printing information is stored in a field 1304. This information is used when additional information such as the number of pages or the date is to be printed on a physical page. For the physical page setting information as well, fields are added in accordance with the function of the system.

Figure 14:
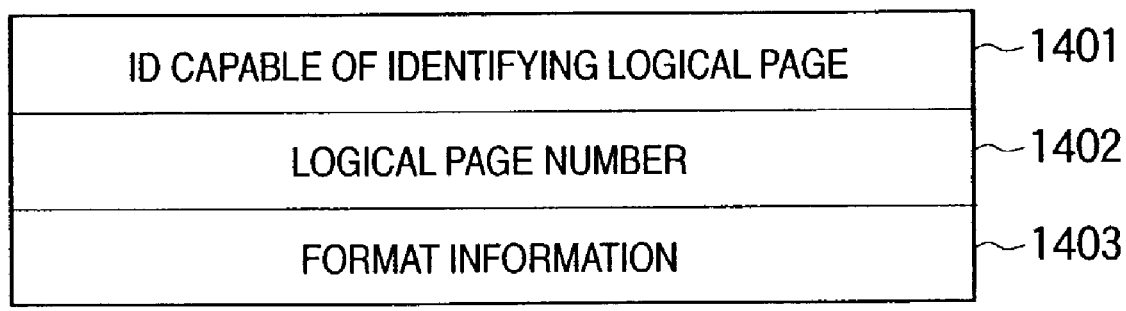
FIG. 14 is a view showing logical page information in a field 1204 shown in FIG. 12.

FIG. 14 is a view showing logical page information in the field 1204 shown in FIG. 12. The ID of a logical page is stored in a field 1401. The intermediate code of a page description file corresponding to the logical page is referred to from the spool file 303 using this ID. In addition, the intermediate code of the logical page only needs to be accessible using the ID. A file, a memory pointer, or the intermediate code itself of the logical page may be included. A logical page number is stored in a field 1402. The logical page number is used when it is to be printed as additional information or as supplementary information of the logical page ID. Format information is stored in a field 1403. Various setting items that can be designated for each logical page are stored. For example, additional print information such as a page frame and information of various settings designated for each logical page, such as an enlargement/reduction magnification, are stored. Attribute information for a logical page such as color/monochrome information for each logical page can also be stored as needed. Conversely, the field 1403 can be omitted in a system which requires no change in settings for each logical page or no attribute information for each logical page.

A job output setting file has the above-described structure. A spool description file has almost the same structure as described above. More specifically, a spool description file has, as a job, a print format (single- or double-side print mode, bookbinding printing, or the like), print layout (Nup or poster printing), additional information (additional digital watermark, date, or user name), the number of copies, and paper size information. Each physical page is formed from a layout order of logical pages, information representing an upper or lower surface in the double-side print mode, and a color mode.

In addition to the extended system described above, a process of realizing the job setting change function by the setting change editor 307 shown in FIG. 3 will be described below. In this embodiment, the setting contents of a job are contained in a spool description file for a single job or in a job output setting file shown in FIG. 10 for a combined job. Since the file is separated from the spool file 303 that stores an intermediate code, the job settings can be changed by re-creating the job output setting file. The setting change editor 307 re-creates or partially rewrites a job output setting file independently or in cooperation with the spool file manager 304, thereby realizing the job setting change function.

Figure 15:
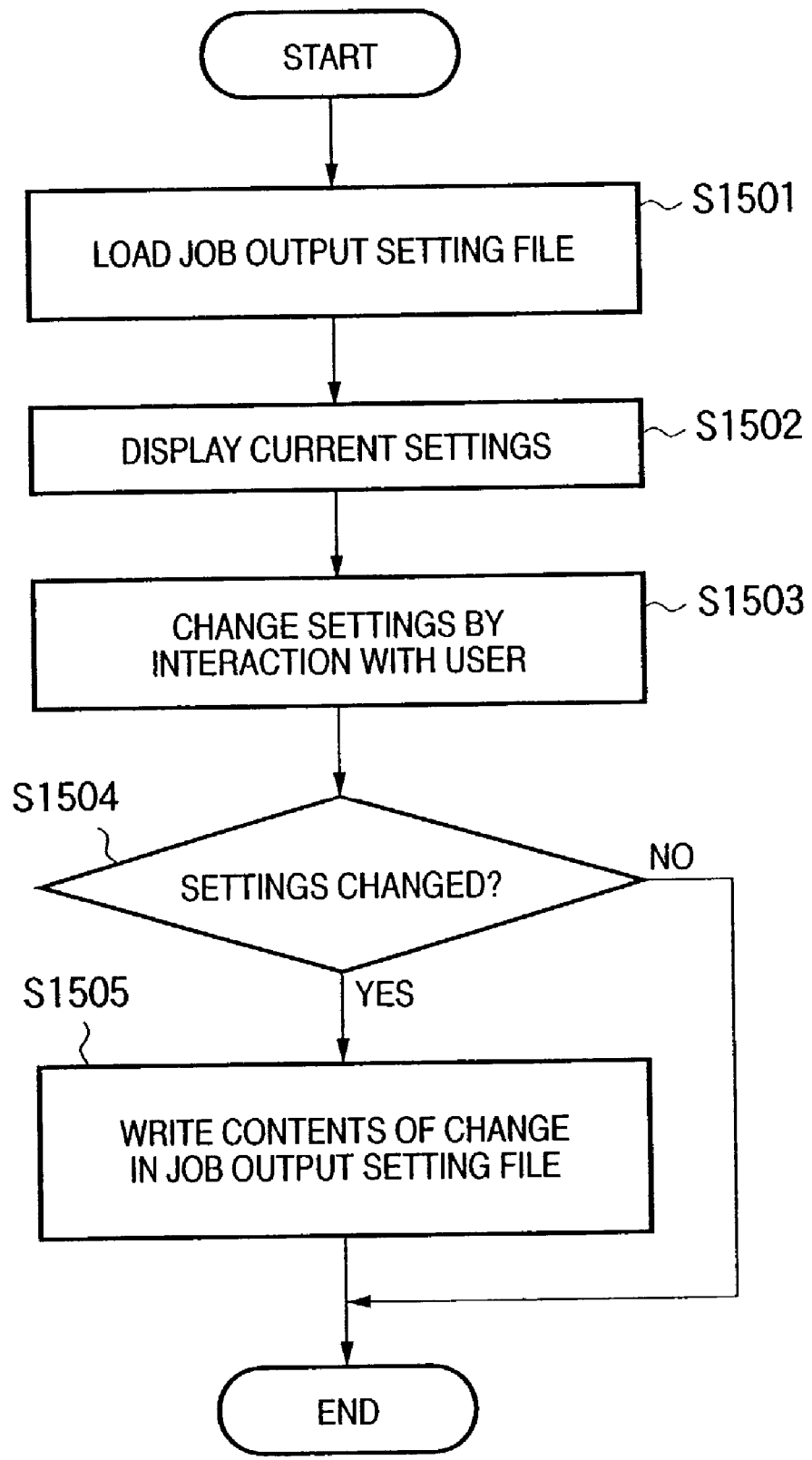
FIG. 15 is a flow chart showing a job setting change process by a setting change editor 307.

FIG. 15 is a flow chart showing a job setting change process by the setting change editor 307. First, in step S1501, the setting change editor 307 loads a spool description file or job output setting file. The job output setting file is the same as that loaded by the previewer 306 or despooler 305. In step S1502, the contents of the loaded file are displayed for the user. In step S1503, the setting contents are changed by interaction with the user on the user interface as shown in FIG. 18 and designating the menu or the like as described above. In this step, not the interaction scheme but a batch scheme of changing the contents in accordance with the contents of setting change written in a file or the like may be employed.

In step S1504, the setting change editor 307 compares the setting contents loaded first in step S1501 with the current setting contents and determines whether the setting contents are changed. If YES in step S1504, the flow advances to step S1505 to generate a new job output setting file and notify the spool file manager 304 that the setting contents are changed. The processing is ended. If NO in step S1504, the spool file manager 304 is notified that the setting contents are kept unchanged, and the processing is ended.

In this way, a new job output setting file is generated. When the user selects an "OK" button on the user interface window shown in FIG. 18, the new job output setting file is validated, and the old job output setting file is deleted. When not a job output setting file but the spool description file of a single job is changed, the file is saved without being deleted. When the user selects a "return to initial state" button on the user interface window shown in FIG. 18, the new job output setting file is deleted, and the old job output setting file is validated and reflected on display.

In this embodiment, the setting change editor 307 has been described as another module. However, the setting change editor 307 may merely be part of the user interface of the spool file manager 304. In addition, instead of causing the setting change editor 307 to actually write the change contents in the job output setting file, the setting change editor 307 may notify the spool file manager 304 of only the contents of setting change, and the job output setting file may be actually changed on the spool file manager 304 side.

In addition to the conventional extended system for combining a plurality of print jobs and printing them as one print job, an extension for despoiling and previewing the combined job will be described next.

The spool file 303 with the intermediate code format is normally generated for each job. For a single job, the intermediate code of each logical page in a job file to be processed is sequentially read out and processed. For this reason, the logical page ID in the field 1401 can be realized by a relative or absolute offset that indicates the location of each logical page in the file. For a combined job, the spool file 303 and page information belonging to the job must be specified from the job ID in the field 1401. In this embodiment, an ID for identifying the spool file 303 is added to a logical page ID, thereby specifying the spool file 303. In this case, only the field 1401 needs to be mainly changed. This is because if the spool file 303 can be identified in the field 1401, loading a page portion can be processed by the same logic as in processing of a single job. When the spool file 303 is stored as separate files for the respective logical pages, the file name of each logical page may be used as a logical page ID in the field 1401.

Next, a case wherein a plurality of different settings are done for an original created by the host computer 3000 of the above-described printing system and transmitted to the printer 1500 as one print job will be described. More specifically, a method of realizing a presentation function using a job binder function (protocol) when, e.g., the printer 1500 has no presentation function of continuously outputting print data received from the host computer 3000 to OHP output for presentation and paper output for distribution (i.e., the printer 1500 cannot understand a command for designating the presentation mode) will be described.

The above-described job binder function makes it possible to continuously transmit PDL data as a plurality of documents between commands that designate the start and end of one print job transmitted from the printer driver 203 to the printer 1500.

Figure 19:
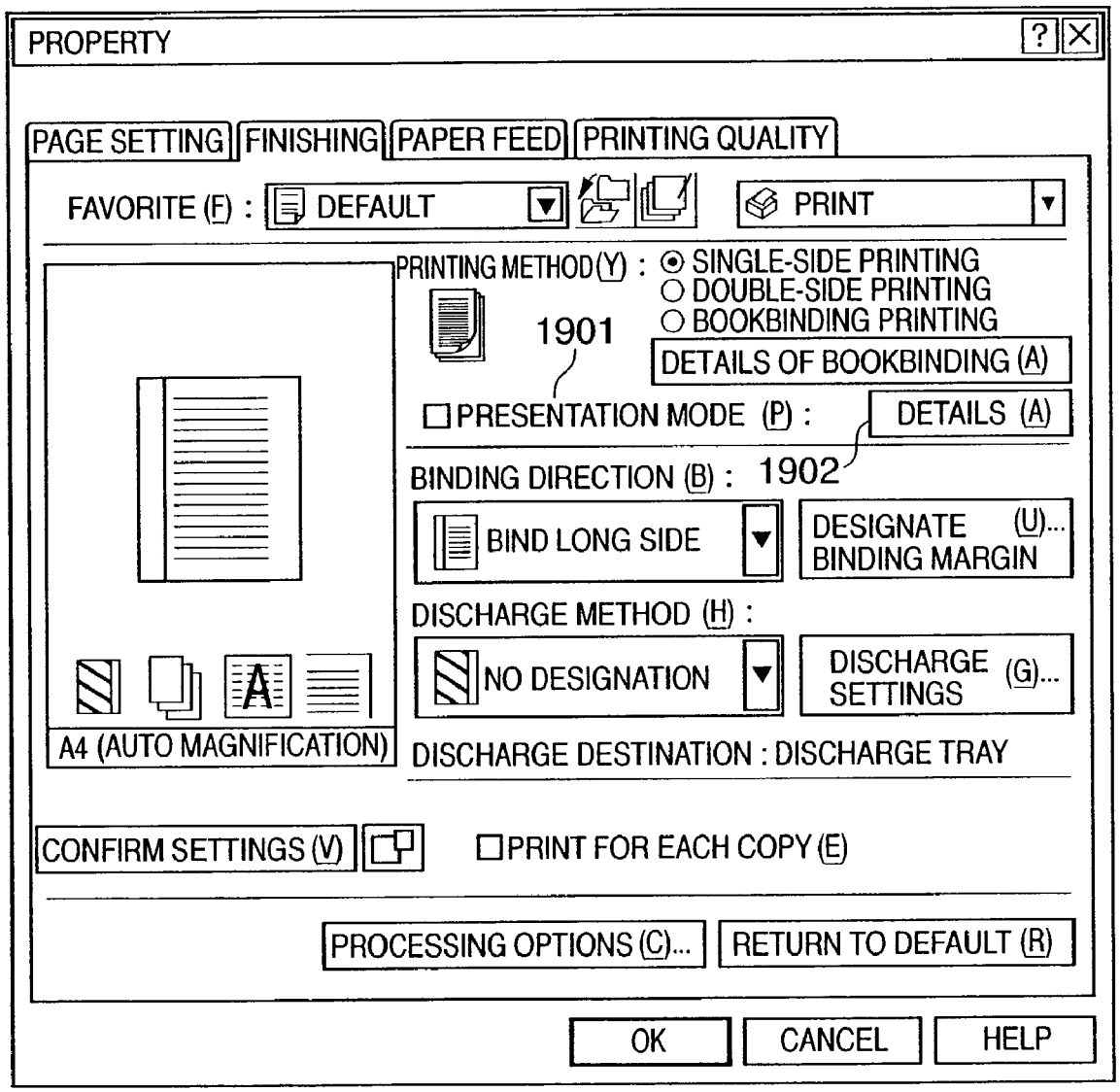
FIG. 19 is a view showing the user interface of a printer driver which designates a print mode in which a single original is printed in accordance with a plurality of print settings.

FIG. 19 is a view showing the user interface of the printer driver 203 which designates a print mode in which a single original is printed in accordance with a plurality of print settings. When a check box of "presentation mode" is checked on this user interface, the presentation function of printing OHP films for presentation and materials to be distributed all at once is validated. In addition, a "detail setting button" 1902 in the presentation mode is validated. When the button is clicked on, a dialogue shown in FIG. 20 is activated.

The above-described user interface is displayed by a display control module (also called a display control means) contained in the printing control program of the present invention.

In the dialogue shown in FIG. 20, details for the presentation mode can be set. The user interface of the printer driver 203 has the same set items as those settable in this user interface of the presentation mode. Settings on the user interface of the printer driver 203 are applied to materials to be distributed. Settings of the above-described dialogue are applied to OHP films. As shown in FIG. 20, set items include paper type 2001, color print mode 2002, output paper size 2003, number 2004 of copies, page layout 2005, printing method 2006, discharge method 2007, and discharge destination 2008. Printing of OHP films for presentation is assumed here. Hence, the default values of the respective settings are "OHP film" as the paper type 2001, "color" or "automatic discrimination" for a color printer as the color print mode 2002, "same as original size" as the output paper size 2003, "1" as the number 2004 of copies, "1 page/sheet (standard)" as the page layout 2005, "single-side printing" as the printing method 2006, and a discharge destination to which OHP films can be discharged as the discharge destination 2008.

Since these settings can be changed on this dialogue, for example, not OHP films but paper sheets may used to output even for presentation, or N-up printing may be executed. Setting on the dialogue is done independently of setting for the materials to be distributed, OHP films may be printed in the color mode while materials to be distributed may be printed in the monochrome mode.

When the user executes printing by designating the presentation mode on the user interfaces shown in FIGS. 19 and 20, the spooler 302 stores process settings for the job in the spool description file of the spool file 303, as described above. The spooler 302 also stores settings for OHP films for presentation, which are set in the user interface shown in FIG. 20 in the spool file 303 in the form of a spool description file. That is, when the presentation mode is set, a spool description file for OHP films of presentation and a spool description file for paper materials to be distributed are stored.

When "edit+preview" is selected for the output destination of the user interface of the printer driver 203 in executing printing, the user interface of the spool file manager 304 shown in FIG. 16 pops up. In addition, the large preview shown in FIG. 17 and the job setting window shown in FIG. 18 can also be used. When a job for which the presentation mode is set is opened on the job setting window, a job setting window in which a check box 1801 of presentation mode shown in FIG. 18 is ON is activated. When the check box 1801 is ON, a detail setting button 1802 and preview subject selection combo-box (combo-box 2103 shown in FIG. 21, 2204 shown in FIG. 22, or 2304 shown in FIG. 23) are validated.

When the detail setting button 1802 is clicked on, the same dialogue as the detail setting dialogue for the presentation mode, which is arranged on the user interface of the printer driver 203 shown in FIG. 20, is displayed. The set contents for the OHP materials for presentation can be confirmed or changed. The contents displayed on this dialogue are read out from the spool description file for OHP materials for presentation, which is stored in the spool file 303. If the contents are changed, the change is stored in a job output setting file, as described above.

In the presentation mode, two job output setting files are stored. That is, a job output setting file for OHP materials for presentation and that for paper materials to be distributed are stored. However, when a job output setting file has already been generated, the dialogue is displayed on the basis of the contents of this job output setting file. The combo-box for selecting the preview subject is designed to select OHP materials for presentation or paper materials to be distributed.

Figure 21:
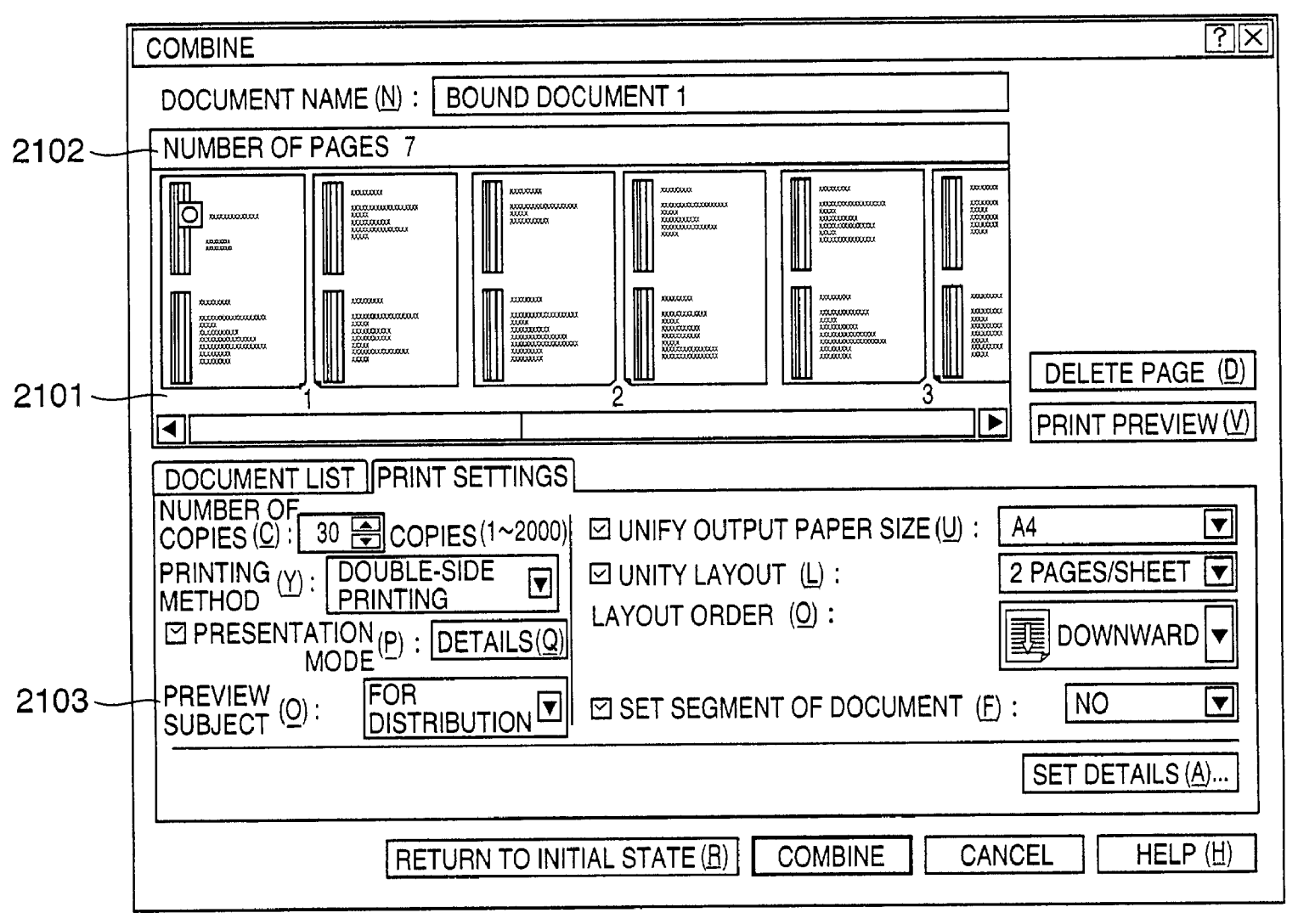

FIG. 21 is a view showing a job setting window when "distribution" is selected in the preview subject selection combo-box 2103. As shown in FIG. 21, in a small preview area 2101, materials to be distributed, which have a layout of 2 pages/sheet on both surfaces, are previewed. As indicated by 2102, the necessary number of sheets is 7. The contents of a spool description file corresponding to the paper materials to be distributed are displayed here. However, if a job output setting file has already been generated, preview display is done on the basis of the contents of the job output setting file.

FIG. 22 is a view showing a job setting window when "presentation" is selected in the preview subject selection combo-box 2204. As shown in FIG. 22, in a small preview area 2201, materials for presentation, which have a layout of 1 page/sheet on a single surface, are previewed. As indicated by 2202, the necessary number of sheets (OHP films) is 27. At this time, print settings 2203 such as the number of copies, printing method, and layout indicate set values for distribution. Only the small preview area 2201 is changed for presentation.

In this display for presentation, unlike the small preview display of the above-described job setting window, preview display is done on the basis of the contents of a spool description file corresponding to OHP materials for presentation, which is stored in the spool file 303. For the remaining display items, display is done on the basis of the contents of a spool description file corresponding to paper materials to be distributed. If a job output setting file has already been generated, both display for presentation and display for distribution are done on the basis of the contents of the job output setting file.

Figure 23:
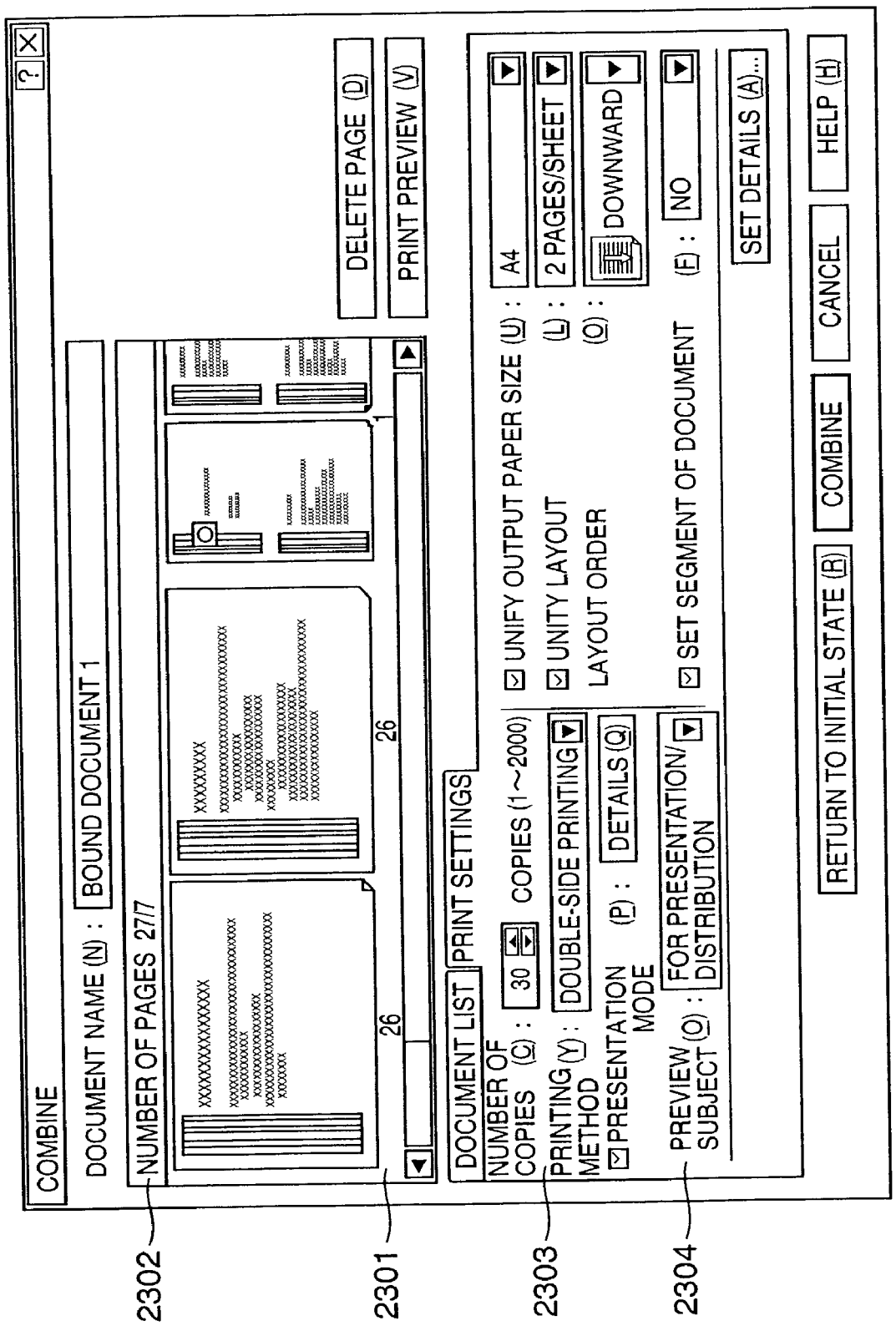
FIG. 23 is a view showing a job setting window when "presentation/distribution" is selected in a preview subject selection combo-box 2304.

FIG. 23 is a view showing a job setting window when "presentation/distribution" is selected in the preview subject selection combo-box 2304. As shown in FIG. 23, in a small preview area 2301, materials for presentation, which have a layout of 1 page/sheet on a single surface, and materials to be distributed, which have a layout of 2 pages/sheet on both surfaces, are previewed. As indicated by 2302, the necessary numbers of OHP films and sheets are 27 and 7, respectively. At this time, print settings 2303 such as the number of copies, printing method, and layout indicate set values for distribution. Only the small preview area 2301 is changed for presentation/distribution.

The contents of a spool description file corresponding to the paper materials to be distributed are displayed here. However, if a job output setting file has already been generated, preview display is done on the basis of the contents of the job output setting file.

In this display for presentation/distribution, in addition to the display for presentation based on the contents of a spool description file corresponding to OHP materials for presentation, which is stored in the spool file 303, the contents of a spool description file corresponding to paper materials to be distributed are displayed. However, if a job output setting file has already been generated, the preview of paper materials to be distributed is displayed on the basis of the contents of the job output setting file. For the remaining display items, display is done on the basis of the contents of a spool description file corresponding to paper materials to be distributed. If a job output setting file has already been generated, both display for presentation and display for distribution are done on the basis of the contents of the job output setting file.

With this processing, print settings for OHP materials for presentation and those for paper materials to be distributed can be confirmed in the preview area before printing. In this embodiment, the user interface of the large preview shown in FIG. 17 has no control function of switching the preview subject. However, as can easily be understood, the preview subject can be switched and previewed like a job setting window.

Processing executed when the presentation mode is validated by the user interface of the printer driver 203 or a job setting window, and printing is executed will be described next. When a mode except "edit+preview" is selected as the output destination setting of the user interface of the printer driver 203, and printing is executed while keeping the presentation mode ON, the user interface of the spool file manager 304 shown in FIG. 16 is not displayed. However, the print processing is the same as that when printing is executed from the spool file manager 304 while selecting "edit+preview".

Figure 24:
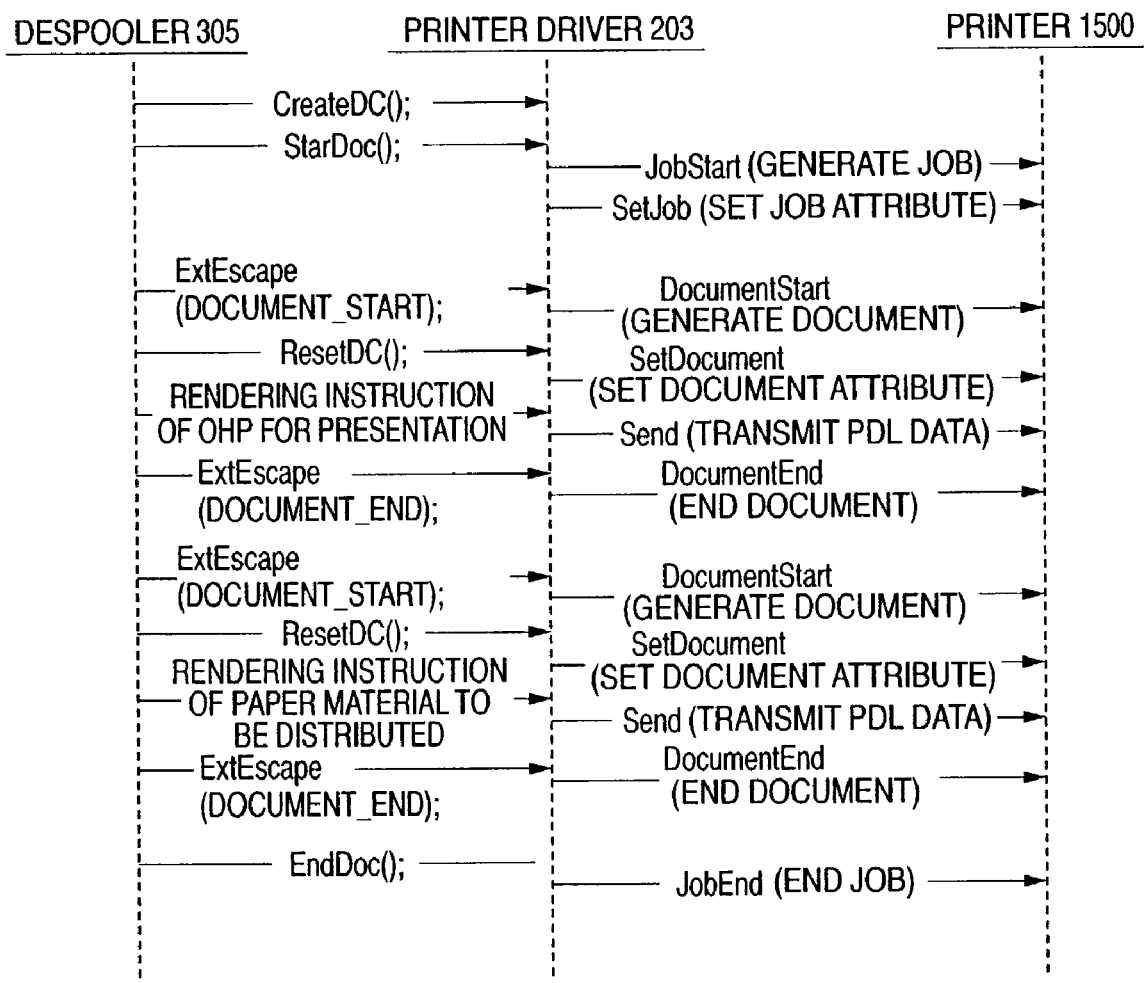
FIG. 24 is a chart showing print processing by the despooler 305 and printer driver 203 in a presentation mode.

FIG. 24 is a chart showing print processing by the despooler 305 and printer driver 203 in the presentation mode. First, the despooler 305 executes processing of generating a print job, e.g., CreateDC( ) or StartDoc( ) for Windows in accordance with a print processing procedure of the OS. The printer driver 203 is notified of this processing through a GDI. The printer driver 203 executes job generation processing and job attribute setting processing for the printer 1500. More specifically, a command for instructing generation of a job and a command for designating the attribute of the job to the printer 1500 are generated and transmitted to the printer 1500 through an OS procedure for transmitting data to the printer 1500.

The despooler 305 executes ExtEscape (DOCUMENT_START) to notify the printer driver 203 of the start of a document having the first print settings. More specifically, it means a notification of the start of printing of an OHP portion for presentation. In next ResetDC( ), the printer driver 203 is notified of print settings for the first document. More specifically, the printer driver 203 is notified of print settings for OHP materials for presentation. In response to these processes, the printer driver 203 executes document generation processing and document attribute setting processing of notifying the printer 1500 of the start of the first document. More specifically, a command for designating print settings for the OHP materials for presentation to the printer 1500 is generated and transmitted to the printer 1500 through an OS procedure for transmitting data to the printer 1500.

After that, the despooler 305 notifies the printer driver 203 of the rendering contents of the first document, i.e., the rendering contents of the OHP materials for presentation through the GDI. As described above, the printer driver 203 receives the rendering contents that are converted from the GDI to a DDT, converts the DDI into a rendering instruction in a form such as a PDL that can be interpreted by a printer, and transmits the instruction to the printer 1500.

The despooler 305 notifies the spooler 302 by ExtEscape (DOCUMENT_END) and ExtEscape (DOCUMENT_START) that the first document is ended, and the second document is to be started. Since the two notifications aim at notifying the printer driver 203 of the boundary between the documents, they may be made up into one notification for notifying the printer driver 203 of the boundary between the documents.

After that, the despooler 305 executes processing for the second document, i.e., the paper materials to be distributed, like processing for the first document. This processing is the same as that for the first document except that notifications of print settings and rendering contents are related to the paper materials to be distributed.

Finally, the despooler 305 executes processing of ending the print job, e.g., EndDoc( ) for Windows, in accordance with the print processing procedure of the OS. The printer driver 203 is notified of this processing through the GDI. The printer driver 203 executes job ending processing. More specifically, a command for instructing the printer 1500 to end the job is generated and transmitted to the printer 1500 through an OS procedure for transmitting data to the printer 1500.

As a means for causing the despooler 305 to notify the printer driver 203 of processing through the GDI, detailed APIs such as ExtEscape( ) and ResetDC( ) have been exemplified above. However, the same processing as described above can be realized even by a means other than the APIs as long as the means can cause the despooler 305 and printer driver 203 to synchronously execute print processing.

With the above processing, a print job generated in the presentation mode sets a plurality of print settings (for presentation and for distribution) for a single document. The plurality of print settings can be transmitted from the printer driver 203 to the printer 1500 as one print job using the job binder function (protocol).

As described above, according to this embodiment, a print job which applies a plurality of print settings to a single original can be previewed. Hence, the printing result can be confirmed on a screen in advance before execution of printing. In addition, a plurality of settings such as layout can be changed while confirming the preview result.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention can also be achieved by supplying a storage medium which stores software program codes for implementing the functions of the above-described embodiment to a system or apparatus and causing the computer (or a CPU or MPU) of the system or apparatus to read out and execute the program codes stored in the storage medium.

In this case, the program codes read out from the storage medium implement the functions of the above-described embodiment by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, or the like can be used.

The functions of the above-described embodiment are implemented not only when the readout program codes are executed by the computer but also when the operating system (OS) running on the computer performs part or all of actual processing on the basis of the instructions of the program codes.

The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As described above, according to the embodiment, when a single original is to be printed on a plurality of output media, a printing result on each output medium or printing results on a plurality of output media can be previewed before printing is executed in accordance with the print settings for each output medium.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus having a printer driver for generating print data to be transmitted to a printing apparatus, said information processing apparatus comprising:
   mode designation means for designating a print mode in which a single original is printed on a plurality of types of output media;
   setting means for setting a different printing layout for each of the plurality of types of output media in a case where the print mode is designated;
   selection means for selecting whether to preview a printing result on the basis of either printing layout in the respective printing layouts set by said setting means; and
   display control means for switching to display a first preview image on the basis of a first printing layout for a first output medium and print data of the single original in a case where a preview of the first printing layout is selected by said selection means, and to display a second preview image on the basis of a second printing layout for a second output medium and the print data in a case where a preview of the second printing layout is selected by said selection means,
   wherein the first preview image and the second preview image are images on the basis of the print data of the single original.

2. The apparatus according to claim 1, wherein the plurality of output media are an OHP film and a paper sheet.

3. The apparatus according to claim 1, wherein said display control means executes control to display a user interface to edit the print settings and display, as the preview, the printing result on the output medium on the basis of the print settings edited through the user interface.

4. The apparatus according to claim 1, wherein
   said selection means selects whether to preview printing results in the job settings set by said setting means, and
   said display control means executes control to display the printing results on the plurality of output media as the preview on the basis of the job settings when whether is selected to preview the printing results in the job settings set by said setting means.

5. The apparatus according to claim 1, further comprising:
   storing means for storing intermediate data to which a rendering command generated by an application is converted; and
   print data generation means for, when a printing is executed, reading the intermediate data stored in said storing means, switching over instructions of print settings according to the print settings for the plurality of output media, and generating print data by a print driver.

6. A display method for an information processing apparatus having a printer driver for generating print data to be transmitted to a printing apparatus, the method comprising:
   a mode designation step of designating a print mode in which a single original is printed on a plurality of types of output media;
   a setting step of setting a different printing layout for each of the plurality of types of output media in a case where the print mode is designated;
   a selection step of selecting whether to preview a printing result on the basis of either printing layout in the respective printing layouts set by the setting step; and
   a display control step of switching to display a first preview image on the basis of a first printing layout for a first output medium and print data of the single original in a case where a preview of the first printing layout is selected by the selection step, and to display a second preview image on the basis of a second printing layout for a second output medium and the print data in a case where a preview of the second printing layout is selected by the selection step,
   wherein the first preview image and the second preview image are images on the basis of the print data of the single original.

7. The method according to claim 6, wherein the plurality of output media are an OHP film and a paper sheet.

8. The method according to claim 6, wherein in the control step, control is executed to display a user interface to edit the print settings and display, as the preview, the printing result on the output medium on the basis of the print settings edited through the user interface.

9. The method according to claim 6, wherein
   the selection step selects whether to preview printing results in the job settings set by the setting step, and
   the display control step executes control to display the printing results on the plurality of output media as the preview on the basis of the job settings when whether is selected to preview the printing results in the job settings set by the setting step.

10. The method according to claim 6, further comprising;.
a storing step of storing intermediate data to which a rendering command generated by an application is converted; and
a print data generation step of, when a printing is executed, reading the intermediate data stored by the storing step, switching over instructions of print settings according to the print settings for the plurality of output media, and generating print data by a print driver.

11. A computer-readable medium embodying computer-executable instructions to cause a computer to function as:
mode designation means for designating a print mode in which a single original is output printed on a plurality of types of output media;
setting means for setting a different printing layout print settings for each of the plurality of types of output media in a case where the print mode is designated;
selection means for selecting whether to preview a printing result on the basis of either printing layout in the respective printing layouts set by said setting means; and
display control means for switching to display a first preview image on the basis of a first printing layout for a first output medium and print data of the single original in a case where a preview of the first printing layout is selected by said selection means, and to display a second preview image on the basis of a second printing layout for a second output medium and the print data in a case where a preview of the second printing layout is selected by said selection means,
wherein the first preview image and the second preview image are images on the basis of the print data of the single original.

12. The computer-readable medium according to claim 11, wherein said display control means executes control to display a user interface to edit the print settings and display, as the preview, the printing result on the output medium on the basis of the print settings edited through the user interface.

13. The computer-readable medium according to claim 11, further said display control means executes control to display a user interface to select the output medium to be previewed and display the printing result on the selected output medium as the preview.

14. The computer-readable medium according to claim 11, wherein
said selection means selects whether to preview printing results in the job settings set by said setting means, and
said display control means executes control to display the printing results on the plurality of output media as the preview on the basis of the job settings when whether is selected to preview the printing results in the job settings set by said setting means.

15. The computer-readable medium according to claim 11, further comprising:
storing means for storing intermediate data to which a rendering command generated by an application is converted; and
print data generation means for, when a printing is executed, reading the intermediate data stored in said storing means, switching over instructions of print settings according to the print settings for the plurality of output media, and generating print data by a print driver.

16. An information processing apparatus having a printer driver for generating print data to be transmitted to a printing apparatus, said information processing apparatus comprising:
mode designation means for designating a print mode in which a single original is printed on a plurality of output media;
setting means for setting a plurality of different print settings for the single original in a case where the print mode is designated;
selection means for selecting whether to preview a first preview or a second preview; and
display control means for switching and displaying, as a preview, a first preview image or a second preview image according to the preview object selected by said selection means,
wherein the first preview image is an image on the basis of the print settings for a first output medium and print data of the single original, and the second preview image is an image on the basis of the respective print settings for the first and second output media and the print data.

17. The apparatus according to claim 16, further comprising setting means for setting print setting for each of the plurality of output media as job settings when the print mode is set, wherein said display control means displays a preview image according to the job settings and the print data.

18. The apparatus according to claim 17, wherein said setting means respectively sets different print settings for each of the plurality of output media as the job settings.

19. The apparatus according to claim 16, wherein said display control means displays the preview image of the second medium in succession to the preview image of the first medium when said selection means selects the second preview in order to display the preview images of first and second media as the preview object.

20. The apparatus according to claim 16, wherein the first preview image and the second preview image are displayed by a different printing layout.

21. A display method for an information processing apparatus having a printer driver for generating print data to be transmitted to a printing apparatus, the method comprising:
a mode designation step of designating a print mode in which a single original is printed on a plurality of output media;
a setting step of setting a plurality of different print settings for the single original in a case where the print mode is designated;
a selection step of selecting whether to preview a first preview or a second preview; and
a display control step of switching and displaying, as a preview, a first preview image or a second preview image according to the preview object selected by the selection step,
wherein the first preview image is an image on the basis of the print settings for a first output medium and print data of the single original, and the second preview image is an image on the basis of the respective print settings for the first and second output media and the print data.

22. The method according to claim 21, further comprising a setting step of setting print setting for each of the plurality of output media as job settings when the print mode is set, wherein the display control step displays a preview image according to the job settings and the print data.

23. The method according to claim 22, wherein the display control step displays the preview image of the second medium in succession to the preview image of the first medium when the selection step selects the second preview in order to display the preview images of first and second media as the preview object.

24. The method according to claim 21, wherein the first preview image and the second preview image are displayed by a different printing layout.

25. A program stored on a computer-readable medium for causing a computer to function as:
- mode designation means for designating a print mode in which a single original is printed on a plurality of output media;
- setting means for setting a plurality of different print settings for the single original in a case where the print mode is designated;
- selection means for selecting whether to preview a first preview or a second preview; and
- display control means for switching and displaying, as a preview, a first preview image or a second preview image according to the preview object selected by said selection means,
- wherein the first preview image is an image on the basis of the print settings for a first output medium and print data of the single original, and the second preview image is an image on the basis of the respective print settings for the first and second output media and the print data.

26. The computer-readable medium according to claim 25, further comprising setting means for setting print setting for each of the plurality of output media as job settings when the print mode is set, wherein said display control means displays a preview image according to the job settings and the print data.

27. The computer-readable medium according to claim 26, wherein said setting means respectively sets different print settings for each of the plurality of output media as the job settings.

28. The computer-readable medium according to claim 25, wherein said display control means displays the preview image of the second media in succession to the preview image of the first medium when said selection means selects the second preview in order to display the preview images of first and second media as the preview object.

29. The computer-readable medium according to claim 25, wherein the first preview image and the second preview image are displayed by a different printing layout.

* * * * *

UNITED STATES PATENT AND TRADEMARK OFFICE
CERTIFICATE OF CORRECTION

PATENT NO. : 7,161,691 B2
APPLICATION NO. : 10/193121
DATED : January 9, 2007
INVENTOR(S) : Nakagiri et al.

It is certified that error appears in the above-identified patent and that said Letters Patent is hereby corrected as shown below:

COLUMN 1:
Line 48, "printing-layout." should read -- printing layout. --.

COLUMN 7:
Line 39, "can" should read -- can carry out --; and
Line 43, "setting" should read -- setting information --.

COLUMN 9:
Line 54, "print," should read -- print --.

COLUMN 10:
Line 55, "detachable" should read -- detachably --.

COLUMN 14:
Line 26, "may" should read -- may be --; and
Line 62, "the notification if" should read -- there has been received a notification of --.

COLUMN 16:
Line 38, "function" should read -- functions --.

COLUMN 17:
Line 19, "revolution" should read -- revolutions --.

COLUMN 18:
Line 50, "despoiling" should read -- despooling --.

COLUMN 22:
Line 19, "DDT," should read -- DDI, --.

COLUMN 24:
Line 16, "whether" should read -- it --; and
Line 65, "whether" should read -- it --.

COLUMN 25:
Line 43, "Further" should read -- wherein --; and
Line 53, "whether" should read -- it --.

UNITED STATES PATENT AND TRADEMARK OFFICE
CERTIFICATE OF CORRECTION

PATENT NO. : 7,161,691 B2
APPLICATION NO. : 10/193121
DATED : January 9, 2007
INVENTOR(S) : Nakagiri et al.

It is certified that error appears in the above-identified patent and that said Letters Patent is hereby corrected as shown below:

COLUMN 26:
Line 24, "setting for" should read -- settings for --;
Line 37-39, Claim 20 should be deleted (amend not entered); and
Line 64, "setting for" should read -- settings for --.

COLUMN 27:
Line 7-9, Claim 24 should be deleted (amend not entered); and
Line 10-25, Claim 25 should be deleted (amend not entered).

COLUMN 28:
Line 1-4, Claim 25 should be deleted (amend not entered);
Line 5-10, Claim 26 should be deleted (amend not entered);
Line 11-14, Claim 27 should be deleted (amend not entered);
Line 15-20, Claim 28 should be deleted (amend not entered); and
Line 20, Claim 29 should be deleted (amend not entered).

Signed and Sealed this

Twentieth Day of November, 2007

JON W. DUDAS
*Director of the United States Patent and Trademark Office*